United States Patent
Imura et al.

(10) Patent No.: US 8,760,003 B2
(45) Date of Patent: Jun. 24, 2014

(54) VEHICLE-USE POWER SUPPLY CONTROL APPARATUS AND CONTROL APPARATUS FOR CONTROLLING ELECTRIC ROTATING MACHINE MOUNTED ON VEHICLE AS MAIN ENGINE

(75) Inventors: Akihiro Imura, Aichi-ken (JP); Hideki Kashiwagi, Kariya (JP)

(73) Assignee: Denso Corporation, Kariya (JP)

( * ) Notice: Subject to any disclaimer, the term of this patent is extended or adjusted under 35 U.S.C. 154(b) by 518 days.

(21) Appl. No.: 13/196,113

(22) Filed: Aug. 2, 2011

(65) Prior Publication Data
US 2012/0026771 A1 Feb. 2, 2012

(30) Foreign Application Priority Data

Aug. 2, 2010 (JP) .................................. 2010-173276
Sep. 21, 2010 (JP) .................................. 2010-210479

(51) Int. Cl.
*B60L 1/00* (2006.01)

(52) U.S. Cl.
USPC .......................................................... 307/9.1

(58) Field of Classification Search
USPC .......................................................... 307/9.1
See application file for complete search history.

(56) References Cited

U.S. PATENT DOCUMENTS 5,635,903 A * 6/1997 Koike et al. .................... 340/441
2010/0045450 A1 2/2010 Suzuki et al.

FOREIGN PATENT DOCUMENTS

| JP | H07-177601 | 7/1995 |
| JP | H07-322403 | 12/1995 |
| JP | H09-026214 | 1/1997 |
| JP | 3382110 | 12/2002 |
| JP | P2005-130614 A | 5/2005 |
| JP | P2005-245087 A | 9/2005 |
| JP | P2005-278281 A | 10/2005 |
| JP | P2005-343360 A | 12/2005 |
| JP | P2007-203924 A | 8/2007 |
| JP | P2008-279938 A | 11/2008 |
| JP | P2009-018991 A | 4/2009 |
| JP | P2009-081991 A | 4/2009 |
| JP | 2009-303288 | 12/2009 |
| JP | P2010-023636 A | 2/2010 |
| JP | 2010-070030 | 4/2010 |
| JP | P2010-098851 A | 4/2010 |
| JP | P2010-166716 A | 7/2010 |

OTHER PUBLICATIONS

Japanese Office Action dated Aug. 7, 2012, issued in corresponding Japanese Application No. 2010-173276, with English translation.
Japanese Office Action dated Aug. 21, 2012, issued in corresponding Japanese Application No. 2010-210479, with English translation.

* cited by examiner

*Primary Examiner* — Robert L. Deberadinis
(74) *Attorney, Agent, or Firm* — Nixon & Vanderhye PC

(57) ABSTRACT

The vehicle-use power supply control apparatus is for controlling transmission of electric power between a vehicle-mounted power supply apparatus including switching elements turned on and off in accordance with manipulation signals and an external power supply located outside the vehicle. The vehicle-use power supply control apparatus includes a control section to output an electric power transmission command signal depending on an electric power transmission request signal received from an external device, and a manipulation signal generating section to generate the manipulation signals based on the electric power transmission command signal received from the control section. The control section is configured to operate in order that noise sound generated due to switching operation of the vehicle-mounted power supply apparatus is within an audio frequency range.

23 Claims, 16 Drawing Sheets

| VOLTAGE VECTOR | SWITCHING ELEMENT TO BE TURNED ON | | |
|---|---|---|---|
| | U-PAHSE | V-PAHSE | W-PAHSE |
| V0 | LOW SIDE | LOW SIDE | LOW SIDE |
| V1 | HIGH SIDE | LOW SIDE | LOW SIDE |
| V2 | HIGH SIDE | HIGH SIDE | LOW SIDE |
| V3 | LOW SIDE | HIGH SIDE | LOW SIDE |
| V4 | LOW SIDE | HIGH SIDE | HIGH SIDE |
| V5 | LOW SIDE | LOW SIDE | HIGH SIDE |
| V6 | HIGH SIDE | LOW SIDE | HIGH SIDE |
| V7 | HIGH SIDE | HIGH SIDE | HIGH SIDE |

VEHICLE-USE POWER SUPPLY CONTROL APPARATUS AND CONTROL APPARATUS FOR CONTROLLING ELECTRIC ROTATING MACHINE MOUNTED ON VEHICLE AS MAIN ENGINE

This application claims priority to Japanese Patent Applications No. 2010-210479 filed on Sep. 21, 2010, and No. 2010-173276 filed on Aug. 2, 2010, the entire contents of which are hereby incorporated by reference.

BACKGROUND OF THE INVENTION

1. Field of the Invention

The present invention relates to a vehicle-use power supply control apparatus mounted on a vehicle for controlling transmission of electric power between the vehicle and an external power supply by manipulating a vehicle-mounted power supply apparatus, and to a control apparatus for controlling an electric rotating machine mounted on a vehicle as a main engine.

2. Description of Related Art

As described, for example in Japanese Patent Application Laid-open No. 2010-70030 (Patent document 1), there is proposed a technique to charge a vehicle battery used for supplying electric power to an electric motor serving as a vehicle main engine from a commercial power supply, and supplying electric power stored in the battery to the outside.

However, there is a concern in such a technique that if transmission of large electric power is interrupted accidentally, for example, by an electrical connection being broken mistakenly by a person near the vehicle who is not aware that electric power transmission is being carried out, disadvantageous effects may occur.

Meanwhile, the level of noise emitted from an electric motor mounted on a vehicle as a main engine and an inverter for supplying electric power to this motor varies depending on the switching frequency of this inverter. Accordingly, as described, for example, in Japanese Patent Application Laid-open No. 2009-303288, it is known to suppress the noise by changing the frequency of a carrier when the inverter is manipulated based on the result of comparison between the carrier and a command voltage.

The noise generated by an electric motor can be suppressed easily compared to the noise generated by an internal combustion engine. Accordingly, a vehicle having an electric motor as its main engine is much quieter than a conventional vehicle whose main engine is an internal combustion engine. On the other hand, however, there is a concern that a quiet vehicle is hard to notice by pedestrians when the vehicle starts moving or is running at a low speed.

SUMMARY

In one aspect of a first invention, there is provided a vehicle-use power supply control apparatus for controlling transmission of electric power between a vehicle-mounted power supply apparatus mounted on a vehicle and an external power supply located outside the vehicle by manipulating the vehicle-mounted power supply apparatus, the vehicle-mounted power supply apparatus including switching elements turned on and off in accordance with manipulation signals, the vehicle-use power supply control apparatus comprising:

a control section to output an electric power transmission command signal depending on an electric power transmission request signal received from an external device; and a manipulation signal generating section to generate the manipulation signals based on the electric power transmission command signal received from the control section, wherein the control section is configured to operate in order that noise sound generated due to switching operation of the vehicle-mounted power supply apparatus is within an audio frequency range.

According to this aspect of the first invention, it is possible for persons near a vehicle on which a power supply apparatus capable of transmitting electric power with an external power supply to be clearly aware that transmission of electric power between the vehicle and the external power supply is being performed.

In one aspect of a second invention, there is provided a control apparatus for controlling an electric rotating machine mounted on a vehicle as a main engine of the vehicle by manipulating, based on model predictive control, a power conversion circuit including a plurality of switching elements that selectively make and break connections between a plurality of voltage sources outputting different voltages and corresponding terminals of the electric rotating machine, comprising:

a prediction means to predict, using a predetermined model of the electric rotating machine, a controlled variable of the electric rotating machine when the power conversion circuit is assumed to be set in a provisional operation state; and a manipulation means to determine an actual operation state of the electric rotating machine based on the predicted controlled variable and a command value indicative of a required controlled variable received from outside, and manipulate the power conversion circuit so that the power conversion circuit is brought to the determined actual operation state;

wherein the manipulation means includes a switching frequency reducing means configured to forcibly reduce a switching frequency of switch states of the switching elements on condition that a running speed of the vehicle is below a predetermined speed.

According to this aspect of the second invention, there is provided a control apparatus for controlling an electric rotating machine mounted on a vehicle as a main engine of the vehicle, enabling pedestrians to notice approach of the vehicle.

Other advantages and features of the invention will become apparent from the following description including the drawings and claims.

PREFERRED EMBODIMENTS OF THE INVENTION

First Embodiment of First Invention

Figure 1:
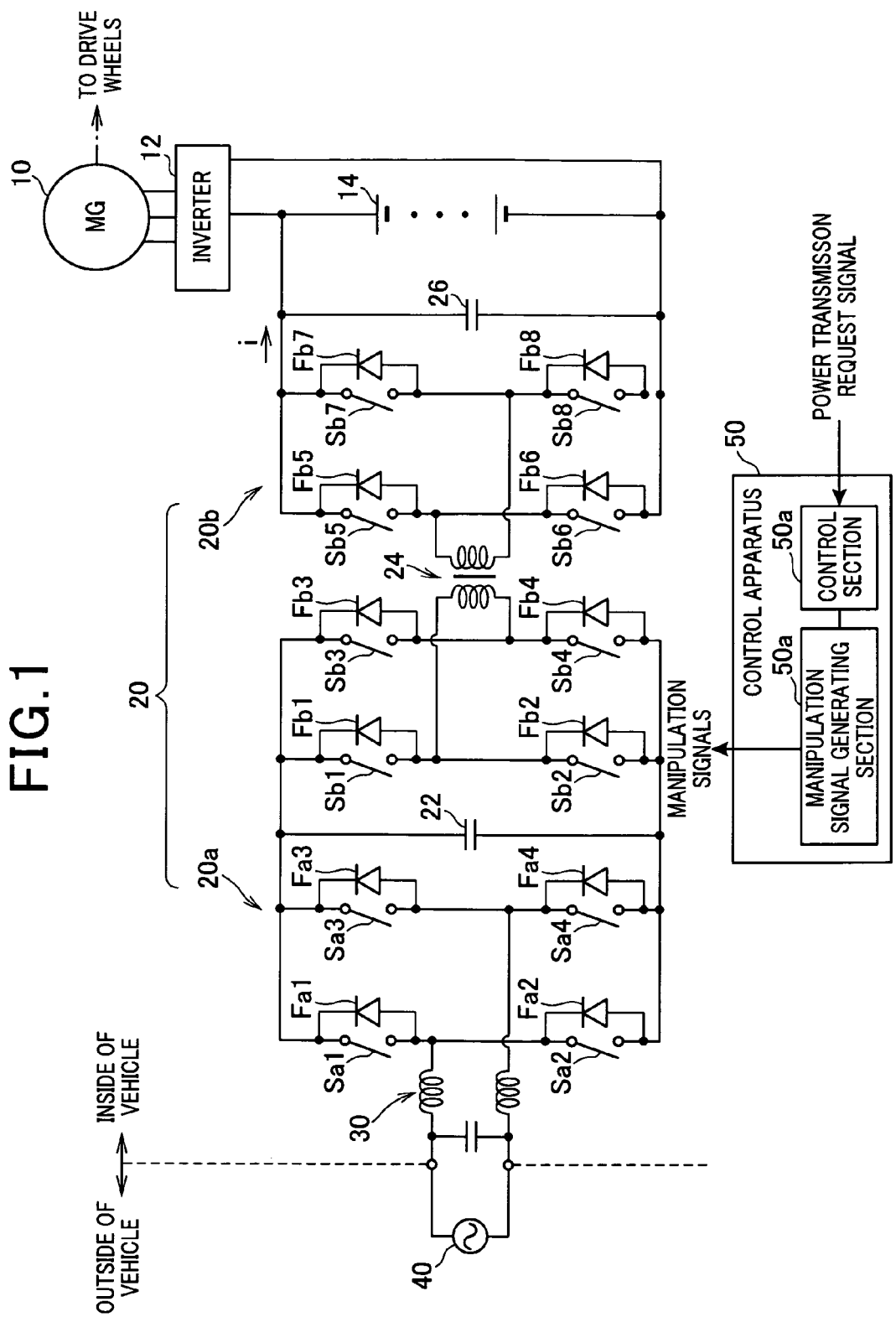
FIG. 1 is a diagram showing the structure of a vehicle power supply system including a vehicle-mounted power supply apparatus and a vehicle-use power supply control apparatus according to a first embodiment of the first invention.

FIG. 1 is a diagram showing the structure of a vehicle power supply system including a vehicle-mounted power supply apparatus and a control apparatus 50 as a vehicle-use power supply control apparatus according to a first embodiment of the first invention.

In FIG. 1, reference numeral 10 denotes a motor-generator which is mechanically coupled to the drive wheels of a vehicle, and serves as a main engine of the vehicle. The motor-generator 10 is connected to a high voltage battery 14 through an inverter 12 as a power conversion circuit. The high voltage battery 14 is a secondary battery whose terminal voltage is higher than 100 V.

In this embodiment, a two-way converter 20 is provided to enable transmission of electric power between an external power supply and the high voltage battery 14. The two-way converter 20 is constituted of an AC-DC converter 20a and a DC-DC converter 20b.

The AC-DC converter 20a has a structure that a series connection of a high-side switching element Sa1 and a low-side switching element Sa2, and a series connection of a high-side switching element Sa3 and a low-side switching element Sa4 are connected in parallel. The switching elements Sa1 to Sa4 are reverse-connected with freewheel diodes Fa1 to Fa4, respectively.

The DC-DC converter 20b includes a capacitor 22, a series connection of a high-side switching element Sb1 and a low-side switching element Sb2 and a series connection of a high-side switching element Sb3 and a low-side switching element Sb4. These are connected in parallel with one another. The DC-DC converter 20b further includes a capacitor 26, a series connection of a high-side switching element Sb5 and a low-side switching element Sb6, a series connection of a high-side switching element Sb7 and a low-side switching element Sb8. These are connected in parallel with one another. The primary coil of a transformer 24 is connected between a connection node of the high-side switching element Sb1 and the low-side switching element Sb2, and a connection node of the high-side switching element Sb3 and the low-side switching element Sb4, is connected. The secondary coil of the transformer 24 is connected between a connection node of the high-side switching element Sb5 and the low-side switching element Sb6 and a connection node of the high-side switching element Sb6 and the low-side switching element Sb7. These switching elements Sb1 to Sb8 are reverse-connected with freewheel diodes Fb1 to Fb8, respectively.

The AC-DC converter 20a can be connected to the outside of the vehicle through a filter circuit 30 constituted of an LC circuit. In this embodiment, the AC-DC converter 20a is connected to a commercial power supply 40 through the filter circuit 30.

The control apparatus 50 controls transmission of electric power between the high voltage battery 14 and an external power supply such as the commercial power supply 40 by manipulating the two-way converter 20.

The control apparatus 50 includes a control section 50a and a manipulation signal generating section 50b. The control section 50a outputs an electric power transmission command signal depending on an electric power transmission request signal received from an external device to the manipulation signal generating section 5ba. The manipulation signal generating section 50b is configured to generate manipulation signals to on/off control the switching elements of the two-way converter 20 based on the electric power transmission command signal received from the control section 50a.

In this embodiment, to charge the high voltage battery 14, AC power of the commercial power supply 40 is converted to DC power by the freewheel diodes Fa1 to Fa4 and the capacitor 22 by turning off all of the switching elements Sa1 to Sa4 constituting the AC-DC converter 20a. The voltage stored in the capacitor 22 is outputted to the high voltage battery 14 through the transformer 24 while being DC-DC converted by alternately turning on and off the switching elements Sb1 and Sb4 and the switching elements Sb2 and Sb3 of the DC-DC converter. At this time, the switching elements Sb5 to Sb8 are kept off, so that the freewheel diodes Fb5 to Fb8 and the capacitor 26 function as a rectifier circuit.

On the other hand, to discharge the high voltage battery 14, the voltage of the high voltage battery 14 is DC-DC converted by alternately turning on and off the switching elements Sb5 and Sb8 and the switching elements Sb6 and Sb7 of the DC-DC converter 20a, and outputted to the AC-DC converter 20a through the transformer 24. At this time, the switching elements Sb1 to Sb4 are kept off, so that the freewheel diodes Fb1 to Fb4 and the capacitor 22 function as a rectifier circuit. Further, by manipulating the switching elements Sa1 to Sa4 of the AC-DC converter 20a, the DC voltage of the capacitor 22 is converted into AC voltage and outputted to the outside.

Since electric power transmitted between the high voltage battery 14 and the external power supply is large, if connection between the external power supply and the vehicle is interrupted during transmission of electric power therebetween, various disadvantageous effects may occur. To deal with this, in this embodiment, the switching frequency of the switching elements of the two-way converter 20 is set such that the noise sound generated due to the switching operation of the two-way converter 20 is within the audio frequency range.

A method of setting the switching frequency based on the manipulation signals outputted form the manipulation signal generating section 50b of the control apparatus 50 is explained in the following.

Figure 2A:
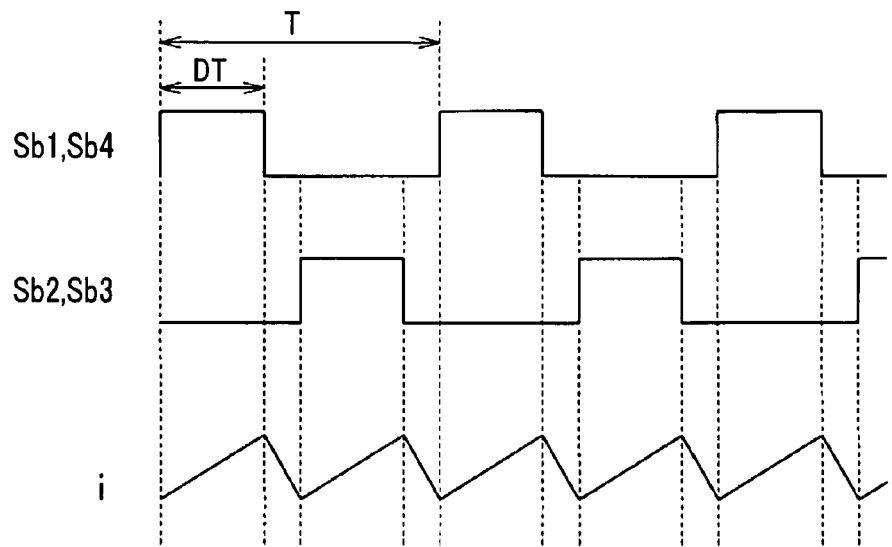
FIGS. 2A to 2C are diagrams for explaining a method of setting the switching frequency of the vehicle-mounted power supply apparatus show in FIG. 1.

FIG. 2A shows variations with time of the operation states of the switching elements Sb1 and Sb4, the operation states of the switching elements Sb2 and Sb3, and the current i flowing to the capacitor 26 at the time of discharging the high voltage battery 14.

As shown in FIG. 2A, the current i starts to gradually increase when the switching elements Sb1 and Sb4 are turned on, and thereafter gradually decreases when the switching elements Sb1 and Sb4 are turned off until the switching elements Sb2 and Sb3 are turned on. Further, as a result of the switching elements Sb2 and Sb3 being turned on, the current i gradually increases, and thereafter gradually decreases when the switching elements Sb2 and Sb3 are turned off until the switching elements Sb1 and Sb4 are turned on. Accordingly, the cycle period T of the switching is equal to twice the cycle period of the current i, and the length of the period during which the current i gradually increases is equal to the on-time duty ratio D of the switching elements Sb1 and Sb4 or switching elements Sb2 and Sb3 multiplied by the cycle period T.

Figure 2B:
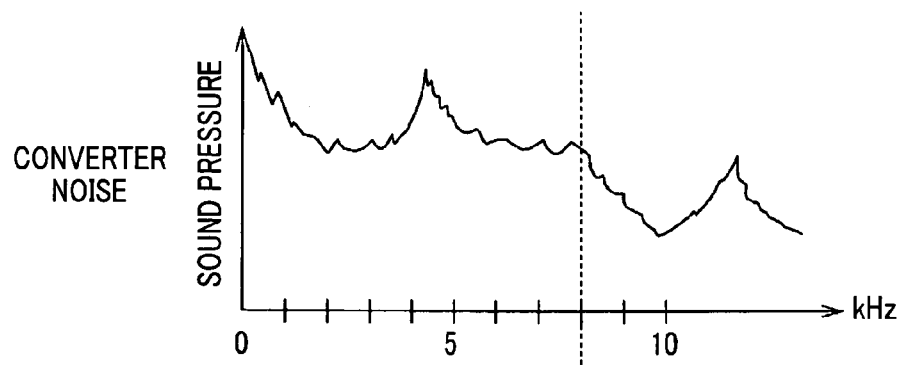

Here, there is a correlation between the ripple frequency of the current i and the frequency of the sound generated due to switching operation. As shown in FIG. 2B, the switching frequency is set such that the sound pressure (intensity) of the noise sound generated due to switching of the two-way converter 20 takes its local maximum at a certain frequency within the audio frequency range (typically, 1 to 12 kHz). More specifically, the switching frequency is set such that the sound pressure takes its local maximum at a frequency within the range from 0.5 to 8 kHz, because any sound within this frequency range is easy to hear for most people. More preferably, this frequency range is from 1 to 5 kHz, because any sound within this frequency range is not unpleasant to hear for most people.

The above setting can be performed by increasing the switching frequency when the local maximum is too high, and decreasing the switching frequency when the local maximum is too low.

In this embodiment, since the switching frequency is fixed, the ripple energy and the sound pressure increases with the increase of the on-time duty ratio D. Accordingly, according to this embodiment, it is possible that the sound pressure is larger when electric power transmitted between the vehicle and the external power supply is larger, for example, when the high voltage battery 14 is quick-charged.

Figure 2C:
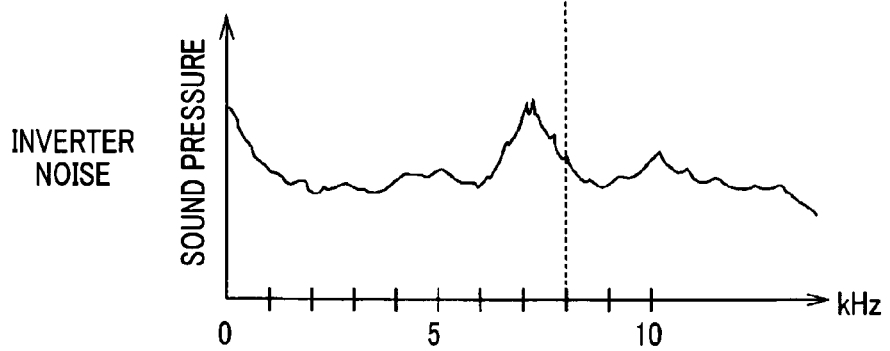

Further, as shown in FIG. 2C, in this embodiment, the frequency at which the noise sound generated due to the switching operation of the inverter 12 takes its local maximum is different from that generated due to the switching operation of the two-way converter 20. This makes it possible to distinguish a situation where transmission of electric power is transmitted between the vehicle and the outside from a situation where the motor-generator operates by the tone of a sound emitted from the vehicle.

The switching frequency of the switching elements Sb5 to Sb8 operated at the time of transmitting electric power from the high voltage battery 14 to the outside is determined in the similar way described above.

The first embodiment of the first invention described above provides the following advantages.

(1) The switching frequency of the two-way converter 20 is set to such a value that the sound pressure of the noise sound generated by the switching operation takes its local maximum within the audio frequency range. This makes it possible to enable persons near the vehicle to be aware that the two-way converter 20 is in operation.

(2) The switching frequency is set such that the local maximum of the sound pressure due to the switching operation within the range of from 0.5 kHz to 8 kHz is larger than that within the higher adjacent frequency range. This makes it possible for persons near the vehicle to be aware more easily that the two-way converter 20 is in operation.

(3) The sound pressure increases with the increase of electric power being transmitted. This makes it possible to increase the sound due to the switching operation to a level sufficiently high for persons near the vehicle to be aware that electric power transmission is being performed between the vehicle and the external power supply.

(4) The frequency at which the noise sound due to the switching operation of the inverter 12 takes its local maximum is different from that of the switching operation of the two-way converter 20. This makes it possible for persons near the vehicle to be aware more reliably that electric power transmission is being performed between the vehicle and the external power supply.

Second Embodiment of First Invention

Next, a second embodiment of the invention is described with a focus on differences with the first embodiment.

The second embodiment is configured to perform a process to reduce the noise sound generated due to the switching operation when transmission of electric power is performed at night.

Figure 3:
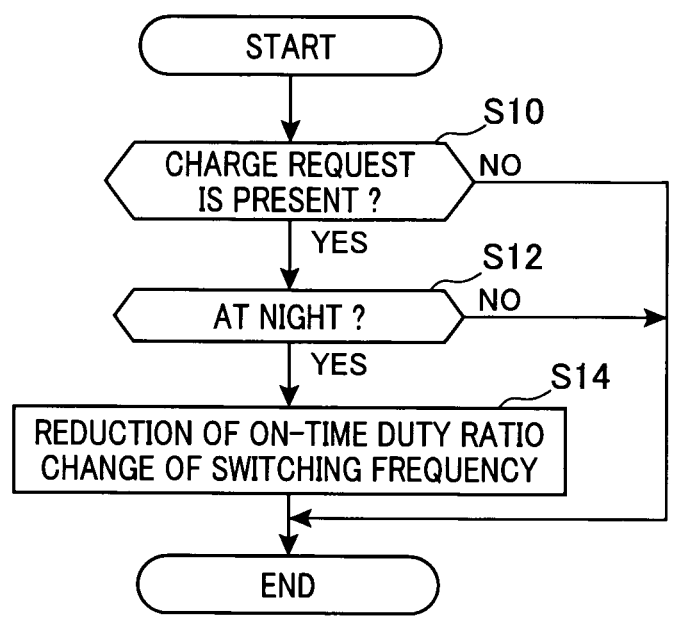
FIG. 3 is a flowchart showing a process for changing the switching frequency performed by the vehicle-use power supply control apparatus show in FIG. 1.

FIG. 3 is a flowchart showing a sound pressure control process performed at regular time intervals by the control apparatus 50 when the two-way converter 20 charges the high voltage battery 14.

This process begins by determining whether there is a battery charge request in step S10 If the determination result in step S10 is affirmative, the process proceeds to step S12 to determine whether it is at night. Step S12 is for determining whether or not it is possible for persons near the vehicle to be aware that the two-way converter 20 is in operation even if the noise sound generated due to the switching operation is reduced.

If the determination result in step S12 is affirmative, the process proceeds to step S14 where the on-time duty ratio D of the switching elements Sb1 and Sb4 and the switching elements Sb2 and Sb3 is reduced, and the switching frequency is changed.

By reducing the on-time duty ratio D, the ripple of the current i becomes small, and accordingly the ripple energy is reduced. As a result, the sound pressure of the noise sound can be reduced. Here, the switching frequency is changed to such a value that the noise sound due to the switching operation of the two-way converter 20 does not transmit long distance.

When step S14 is completed, or a negative determination is made in step S10 or S12, the process is terminated.

The second embodiment of the first invention provides the following advantage in addition to the above advantages (1) to (4) provided by the first embodiment.

(5) The sound pressure of the noise sound due to the switching operation of the two-way converter 20 and the switching frequency of the two-way converter 20 can be changed depending on the time of day in which two-way converter 20 operates.

Modifications

It is a matter of course that various modifications can be made to the above embodiments as described below.

Regarding the switching frequency: The switching frequency may be slightly varied periodically, in view of the fact that people are likely to feel uncomfortable to hear a sound of a constant frequency. However, the switching frequency should be changed such that the frequency at which the sound pressure of the noise sound peaks is within the audio frequency range (preferably, within the frequency range of from 0.5 to 8 kHz).

The switching frequency may be changed not periodically but in a random order.

Regarding variable setting of the sound pressure level and the switching frequency:

The variable setting of the sound pressure level and the switching frequency is not limited to the one described above. For example, the above embodiments may be provided with a microphone to measure the sound pressure level and the switching frequency to enable that the switching frequency is variably set such that the sound pressure due to the switching operation of the two-way converter 20 peaks at a side of the audio frequency range (preferably, within the frequency range from 0.5 to 8 kHz) opposite to the side where the ambient noise is larger.

Further, the efficiency of the AC-DC converter 20a may be reduced to increase the sound pressure level. More specifically, the AC-DC converter 20a may be manipulated so that the power factor is reduced at the time of supplying electric power from the high voltage battery 14 to the commercial power supply 40. In this case, since electric power handled by the DC-DC converter 20b increases by that much, it becomes easy to increase the sound pressure level due to the switching operation.

Regarding the power inverter circuit which operates to drive the vehicle:

In the above embodiments, the switching frequency of the two-way converter 20 and the switching frequency of the inverter 20 are set to different values in order to avoid confusion between the sound due to the switching operation of the two-way converter 20 and that of the inverter 12. However, in order to avoid confusion with the sound due to the switching operation of a step-down converter (not shown) for stepping down the voltage of the high voltage battery 14 and outputting it to a low voltage battery (not shown), the switching frequencies of the step-down converter and the two-way converter 20 may be set to different values.

Incidentally, for the inverter 12, the switching frequency may be set such that the switching noise is very small in the audio frequency range. Also by this setting, it is possible to cause persons near the vehicle to be aware clearly that transmission of electric power using the two-way converter 20 is in operation.

Regarding the vehicle-mounted power supply apparatus:

The vehicle-mounted power supply apparatus is not limited to the one that includes a two-way converter. The invention can be used for a vehicle-mounted power supply apparatus whose function is limited to charging its high voltage battery using electric power of a commercial power supply.

An example of such a vehicle-mounted power supply apparatus is the one described as the first or second embodiment from which the switching elements Sa1 to Sa4 of the AC-DC converter 20a and the switching elements Sb5 to Sb8 of the DC-DC converter 20b are eliminated.

Further, such a vehicle-mounted power supply apparatus may be the one having the similar structure as the inverter 12.

First Embodiment of Second Invention

Figure 4:
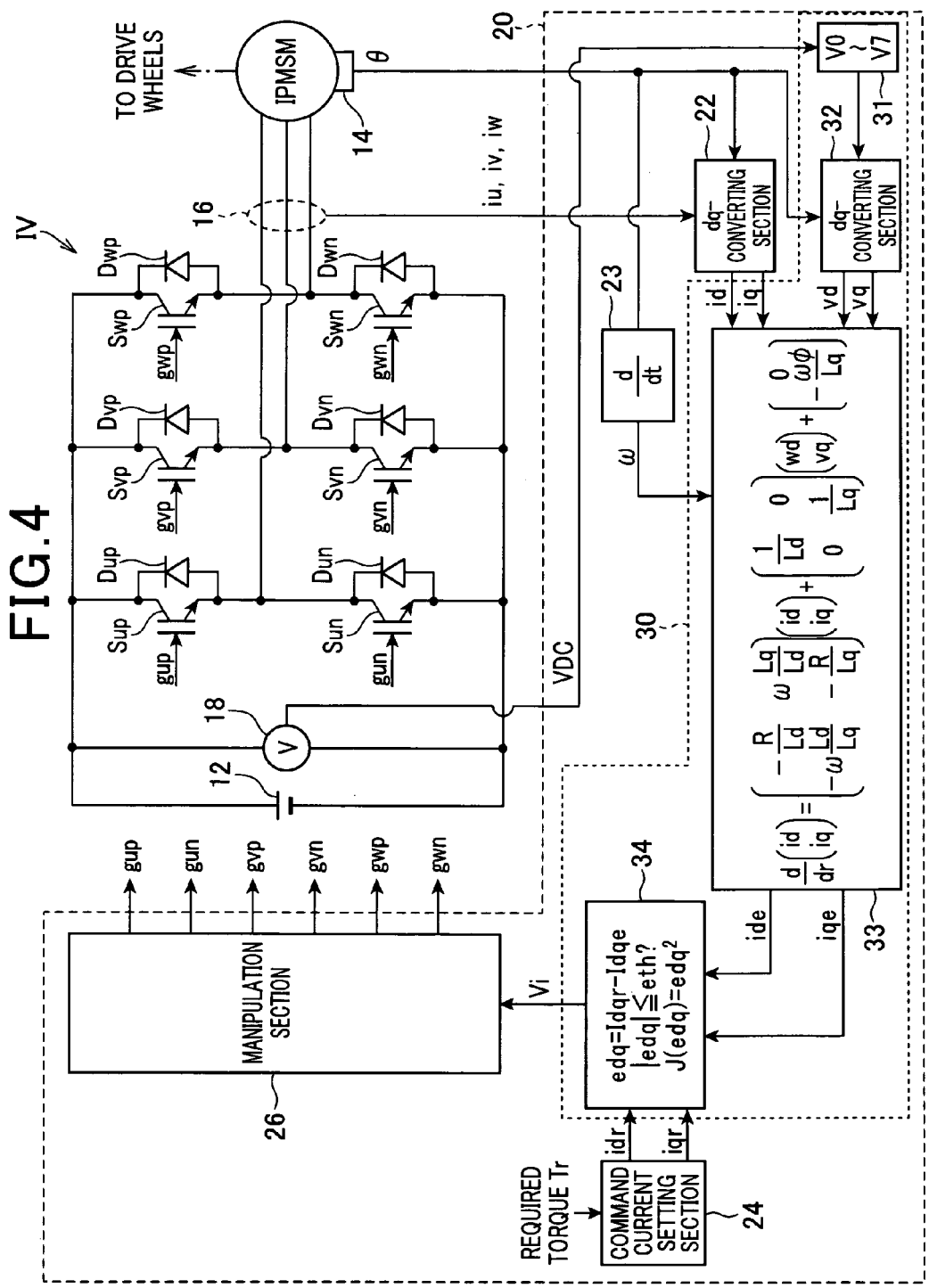
FIG. 4 is a diagram showing the structure of a motor-generator control system including an electric rotating machine control apparatus according to a first embodiment of the second invention.

FIG. 4 is a diagram showing the structure of a motor-generator control system including an electric rotating machine control apparatus according to a first embodiment of the second invention. The motor-generator 10 is a salient-pole type electric rotating machine which operates as a three-phase permanent magnet synchronous motor. That is, the motor-generator 10 is an IPMSM (Interior Permanent magnet Synchronous Motor). The motor-generator 10 is a vehicle main engine, and mechanically coupled to the drives wheels of the vehicle.

The motor-generator 10 is connected to a high voltage battery 12 through an inverter IV. The inverter IV is constituted of a series connection of switching elements Sup and Sun, a series connection of switching elements Svp and Svn, and a series connection of switching elements Swp and Swn, these series connections being connected to the U, V and W phases of the motor-generator 10, respectively. In this embodiment, as these switching elements Sup, Sun, Svp, Svn, Swp and Swn, IGBTs (Insulated Gate Bipolar Transistors) are used. These switching elements Sup, Sun, Svp, Svn, Swp and Swn are anti-parallel connected with diodes Dup, Dun, Dvp, Dvn, Dwp and Dwn, respectively.

As means for detecting the operation states of the motor-generator 10 and the inverter IV, this embodiment includes a rotation angle sensor 14 to detect the rotational angle (electric angle $\theta$) of the motor-generator 10, a current sensor 16 to measure the phase currents iu, iv and iw flowing through the respective phases of the motor-generator 10, and a voltage sensor 18 to measure the input voltage of the inverter IV (power supply voltage VDC).

The sensor signals from these sensors are inputted to the rotating machine control apparatus (referred to as control apparatus hereinafter) 20 constituting a low-voltage system through an interface (not shown). The control apparatus 20 generates manipulation signals to manipulate the inverter IV in accordance with the sensor signals. In more detail, the control apparatus 20 generates manipulations signals gup, gun, gvp, gvn, gwp and gwn to control the switching elements Sup, Sun, Svp, Svn, Swp and Swn, respectively.

The control apparatus 20 performs control of a controlled variable using model predictive control, and sound pressure control. First, the control of the controlled variable using model predictive control is explained.

The control apparatus 20 manipulates the inverter IV in order to control the torque of the motor-generator 10 at a required torque Tr. More specifically, the control apparatus 20 manipulates the inverter IV such that the current supplied from the inverter IV to the motor-generator 10 is kept at a command current to enable the motor-generator 10 to generate the required torque Tr. Although the torque generated by the motor-generator 10 is the final controlled variable to be attained, in this embodiment, the current supplied from the inverter IV to the motor-generator 10 as a direct controlled variable is controlled at the command current. The model predictive control performed in this embodiment is for predicting the current flowing through the motor-generator 10 in a state where the operation state of the inverter IV is provisionally set in order to control the current flowing through the motor-generator 10 at the command current, and determining the actual operation state of the inverter IV based on the difference between the predicted current and the command current.

The phase currents iu, iv and iw measured by the current sensor 16 are converted into actual currents id and iq in a rotating coordinate system by a dq-converting section 22. The electrical angle θ measured by the rotation angle sensor 14 is inputted to a speed calculating section 23. The speed calculating section 23 calculates the rotational speed (electrical angular velocity ω) of the motor-generator 10 based on the electrical angle θ. A command current setting section 24 outputs command currents idr and iqr in a dq-coordinate system in accordance with the required torque Tr inputted thereto. Here, the command currents idr and iqr are set to enable generating the largest torque with the smallest current. The command currents idr and iqr, the actual currents id and iq, and the electrical angle θ are inputted to a model predictive control section 30 as input parameters. The model predictive control section 30 determines a voltage vector Vi to specify the operation state of the inverter IV based on these input parameters. The voltage vector Vi is inputted to a manipulation section 26 which generates the manipulation signals to be supplied to the inverter IV.

Figures 5A, 5B:
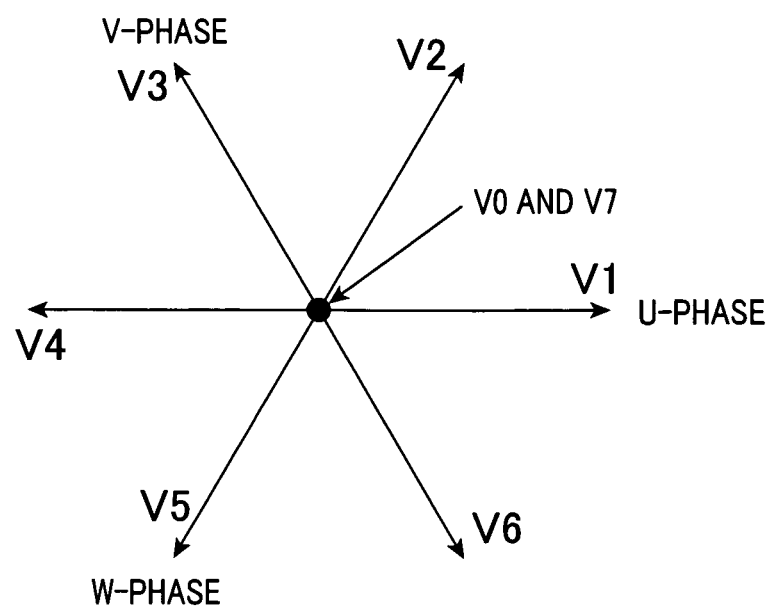
FIGS. 5A and 5B are diagrams showing voltage vectors representing the operation state of an inverter included in the motor-generator control system shown in FIG. 4.

The operation state of the inverter IV is represented by eight voltage vectors V0 to V7 shown in FIG. 5A. For example, the voltage vector V0 represents a state where the switching elements Sun, Svn and Swn on the low voltage side (distinguished by "LOW SIDE" in FIG. 5A) are on, and the voltage vector V7 represents a state where the switching elements Sup, Svp and Swp on the high voltage side (distinguished by "HIGH SIDE" in FIG. 5A) are on. The voltage vectors V0 and V7 are for causing the voltages applied to the motor/generator 10 by the inverter IV to be zero for short-circuiting all the phases of the motor/generator 10. Accordingly, they are called a zero voltage vector. Each of the other voltage vectors V1 to V6 is for specifying a state in which at least one of the upper arms (the switching elements on the high voltage side) and at least one of the lower arms (the switching elements on the lower voltage side) are on. Accordingly, they are called an effective voltage vector. FIG. 5B is a diagram showing the effective voltage vectors V1 to V6 on the fixed two-dimensional coordinate system whose origin is defined by the zero voltage vectors V0 and V7. As shown in FIG. 5B, the voltage vectors V1, V3 and V5 represent the states in each of which the switching element on the high voltage side of one of the U, V and W phases is on.

Next, the operation of the model predictive control section 30 is explained. An operation state setting section 31 shown in FIG. 4 sets one of the voltage vectors V0 to V7 shown in FIG. 5B as the operation state of the inverter IV. A dq-converting section 32 dq-converts the voltage vector set by the operation state setting section 31 into a voltage vector Vdq=(vd, vq) in the dq-coordinate system. This conversion can be performed by replacing "HIGH SIDE" and "LOW SIDE" with "VDC/2" and "−VDC/2", respectively for each of the voltage vectors V0 to V7 shown in FIG. 5A. For example, the voltage vector V0 is converted into (−VDC/2, −VDC/2, −VDC/2), and the voltage vector V1 is converted into (VDC/2, −VDC/2, −VDC/2).

A prediction section 33 predicts actual currents id and iq for the operation state of the inverter IV set by the operation state setting section 31 based on the voltage vector (vd, vq), the present actual currents id and iq, and the electrical angular velocity ω. Here, the following voltage equations (c1) and (c2) are solved with respect to the derivative terms of the currents to obtain the following state equations (c3) and (c4), and the currents one step ahead are predicted by discretizing the obtained state equations (c3) and (c4).

$$vd = (R+pLd)id - \omega Lq iq \tag{c1}$$

$$Vq = \omega Ld id + (R+pLq)iq + \omega \phi \tag{c2}$$

$$pid = -(R/Ld)id + \omega(Lq/Ld)iq + vd/Ld \tag{c3}$$

$$piq = -\omega(Ld/Lq)id - (Rd/Lq)iq + vq/Lq - \omega\phi/Lq \tag{c4}$$

In the equations (c1) and (c2), R denotes the resistance, p denotes a differential operator, Ld denotes the d-axis inductance, Lq denotes the q-axis inductance, and φ denotes the linkage flux constant.

An operation state determining section 34 determines the operation state of the inverter IV from the currents ide and iqe predicted by the prediction section 33, and the command currents idr and iqr inputted thereto. In this embodiment, the operation state determining section 34 uses an evaluation function J to make the determination. Each of the operation states set by the operation state setting section 31 is evaluated by use of the evaluation function J, and the operation state having the highest evaluation is selected. In this embodiment, as the evaluation function J, there is adopted such a function that the output value thereof is larger when the evaluation is lower. More specifically, the evaluation function J is calculated based on the inner product between the command current vector Idqr=(idr, iqr) and the predicted current vector Idqe=(ide, iqe). This is because the difference between the command current vector Idqr and the predicted current vector Idqe takes both a positive value and a negative value. Hence, the evaluation by the evaluation function J becomes lower when the difference between the command current vector Idqr and the predicted current vector Idqe becomes larger.

Using the evaluation function J makes it possible to select one of the operation states, which minimizes the difference between the predicted current vector Idqe and the command current vector Idqr in every control cycle Tc. However, using the evaluation function J may also increase the frequency of switching of the switch state, because an optimum solution in a microscopic time scale is selected.

In view of the above, the inventors thought of referring to an average voltage vector Va to determine the operation state at the next control cycle Tc. The average voltage vector Va represents a fundamental component having the electrical angular frequency of the output voltage of the inverter IV. The inverter IV changes the switch state at intervals shorter than one electrical angle cycle, so that the output voltage of the inverter IV follows a sine wave having the component of the electrical angular frequency. The average voltage vector Va corresponds to the voltage of the sine wave shape outputted from the inverter IV. The norm of the average voltage vector Va is a physical value which is in proportion to a modulation index or a voltage usage factor. Here, the modulation index corresponds to the Fourier coefficient of the fundamental component of the output voltage of the inverter IV. In this embodiment, to calculate this Fourier coefficient, the amplitude center of the fundamental wave and the center of variation of the output voltage of the inverter IV are aligned with each other.

The average voltage vector Va is appropriate to set the current actually flowing through the motor/generator 10 at the command currents idr and iqr. Accordingly, the inventors considered that referring to the average voltage vector Va would makes it possible to select the optimum operation state in a timescale longer than the control cycle Tc by the model predictive control without prolonging the prediction period. More specifically, in this embodiment, the switch state is changed referring to the switch pattern of the switch state of the triangular wave PWM control shown in FIG. 6 as a norm.

Figure 6:
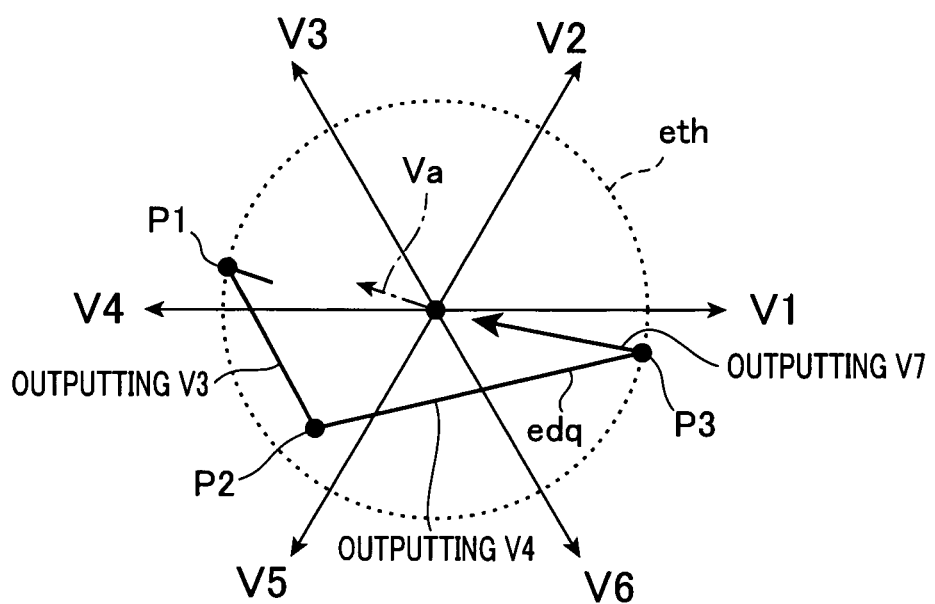
FIG. 6 is a diagram showing a normative switching transition of the inverter in the first embodiment of the second invention.

FIG. 6 is a diagram showing an example of transition of the operation state selected by the model predictive control performed in this embodiment. As shown in FIG. 6, one of the two effective voltage vectors making the smallest angles with the average voltage vector Va is selected (V3 in FIG. 6) at a point P1 where the current error exceeds an allowable range (where the norm of the error vector edq becomes larger than a threshold value eth). Afterwards, the other of the two effective voltage vectors (V4 in FIG. 6) is selected at a point P2. Thereafter, at a point P3 where the current error again exceeds the allowable range (where the norm of the error vector edq becomes larger than the threshold value eth), the zero voltage vector (V7 in FIG. 6) is selected. Hence, as in the case of using the triangular-wave PWM process, duration of the operation state represented by the zero voltage vector can be prolonged, to thereby reduce the number of times that the switch state is changed.

Next, the process of the model predictive control in this embodiment is explained with reference to the flowchart of FIG. 7. This process is performed repeatedly by the control apparatus 20 at time intervals of the control cycle Tc.

First, in step S10, the voltage vector (n) representing the present (this time) operation state is provisionally set as the voltage vector V(n+1) representing the operation state at the next update timing (at the next one of the update timings coming at intervals of the control cycle Tc). In subsequent step S12, a prediction process is performed to calculate the predicted current vector Idqe(n+2) at the timing one control cycle Tc ahead of the next update timing.

Figure 8:
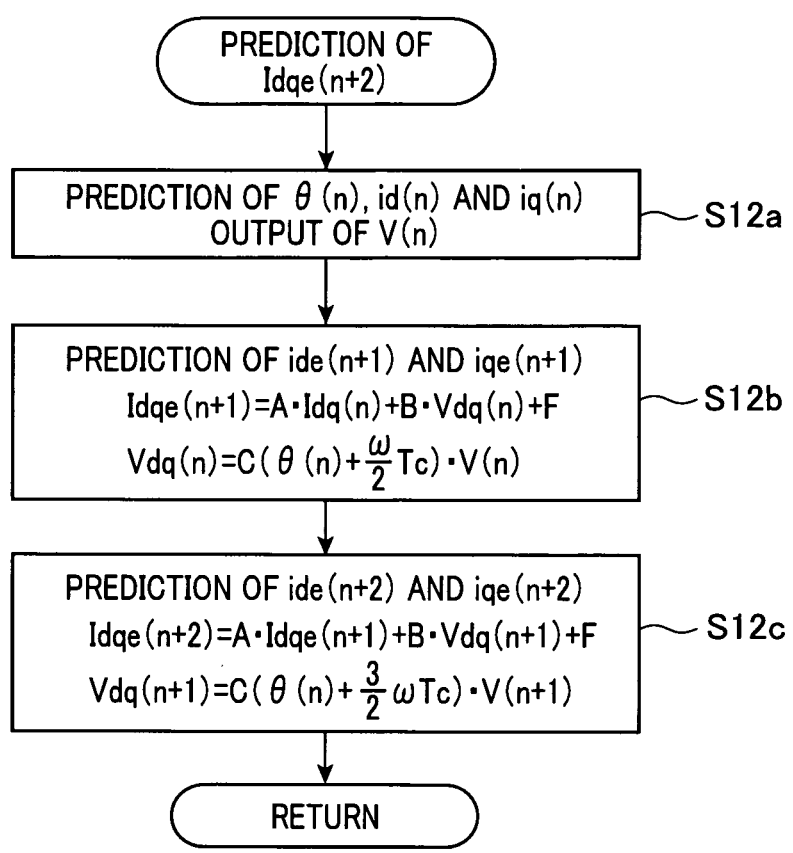
FIG. 8 is a flowchart of a current predicting process in the model predictive control.

This prediction process is explained in more detail with reference to the flowchart shown in FIG. 8.

This prediction process begins in step S12a where the electrical angle θ(n), and the actual currents id(n) and iq(n) are measured, and the voltage vector V(n) determined at the previous control cycle Tc is outputted. In subsequent step S12b, the currents (ide(n+1), iqe(n+1)) one control cycle ahead are predicted. Step S12b is for predicting the currents at the time one control cycle ahead based on the voltage vector V(n) outputted in step S12a. Here, the currents ide (n+1) and iqe (n+1) are calculated using the model represented by the foregoing equations (c3) and (c4) and discretized at intervals of the control cycle Tc by a forward difference method. In this calculation, the actual currents id(n) and iq(n) measured in step S12a are used as initial values of the currents, and the voltage vector V(n) in the fixed coordinate system dq-converted in accordance with "electrical angle θ(n)+ωTc/2" is used as the voltage vector in the dq-axes. This dq-conversion is for reducing the discretization error in the forward difference method.

In subsequent step S12c, the currents two control cycles ahead when the voltage vector V(n+1) is set for the next update timing are calculated. That is, the predicted currents ide (n+2) and iqe (n+2) are calculated in the same way as in step S12b. However, in this calculation, the predicted currents ide(n+1) and iqe(n+1) calculated in step S12b are used as initial values of the currents, and the voltage vector V(n+1) in the fixed coordinate system dq-converted in accordance with "θ(n)+3ωTc/2" is used. After completion of step S12c, a return is made to the process shown in FIG. 7.

Figure 7:
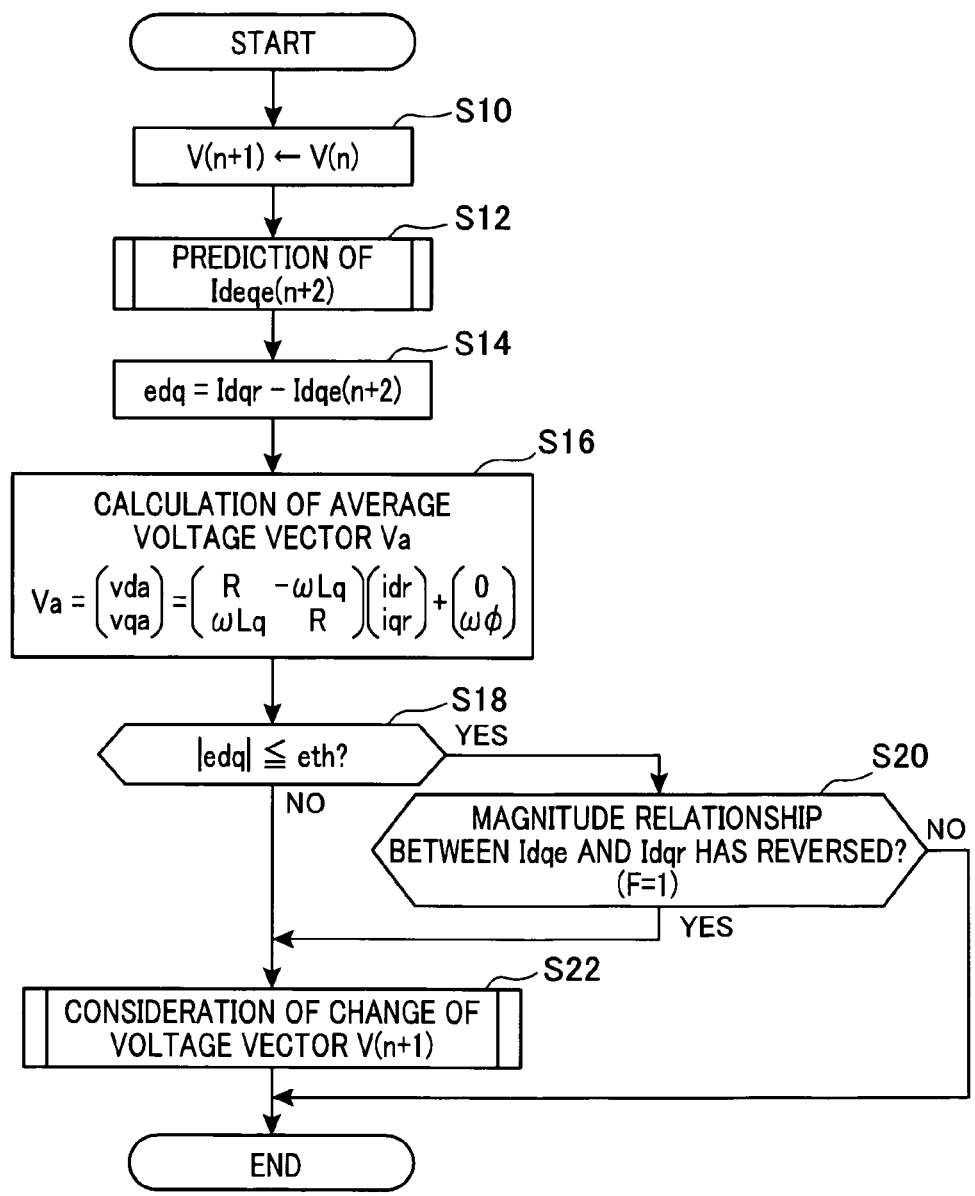
FIG. 7 is a flowchart showing a process of model predictive control in the first embodiment of the second invention.

In step S14 shown in FIG. 7, the error vector edq is calculated by subtracting the predicted current vector idqe (n+2) from the command current vector Idqr. In subsequent step S16, the average voltage vector Va is calculated. Here, the average voltage vector Va is calculated by substituting the command current vector Idqr into the foregoing equations (c1) and (c2) eliminated with the differential operator p. That is, since the average of the current flowing through the motor/generator 10 is the command currents idr and iqr except for the ripple current due to change of the switch state, a voltage applied to the motor-generator 10 when the command currents idr and iqr flow through the motor-generator 10 steadily is calculated as the average voltage vector Va.

In subsequent step S18, it is determined whether or not the current error is within the allowable range (whether or not the norm |edq| of the error vector edq is smaller than or equal to the threshold value eth). It is preferable that the threshold value eth is variably set depending on the state variable of the motor-generator 10 such as the amplitude of the current or electrical angular velocity ω. If the determination result in step S18 is affirmative, the process proceeds to step S20 to determine whether or not the magnitude relationship between the norm |Idqr| of the command current vector Idqr and the norm |Idqe| of the predicted current vector Idqe has reversed. Step S20 is for determining whether the point P2 shown in FIG. 6 is reached. If the determination result in step S20 is affirmative, a state transition permission flag F is set to 1 on condition that the present voltage vector V(n) is one of the two effective voltage vectors forming the smallest angles with the average voltage vector Va. That is, the state transition permission flag F is set to 1 when the logical AND of the condition that the present voltage vector V(n) is one of the two effective voltage vectors forming the smallest angles with the average voltage vector Va, and the condition that the magnitude relationship between the norm |Idqr| of the command current vector Idqr and the norm |Idqe| of the predicted current vector Idqe has reversed.

If the determination result in step S18 is negative, or if the determination result in step S20 is affirmative, the process proceeds to step S22 to consider change of the voltage vector V(n+1) at the next update timing. When step S22 is completed, or if the determination result in step S20 is negative, the process is terminated.

Figure 9:
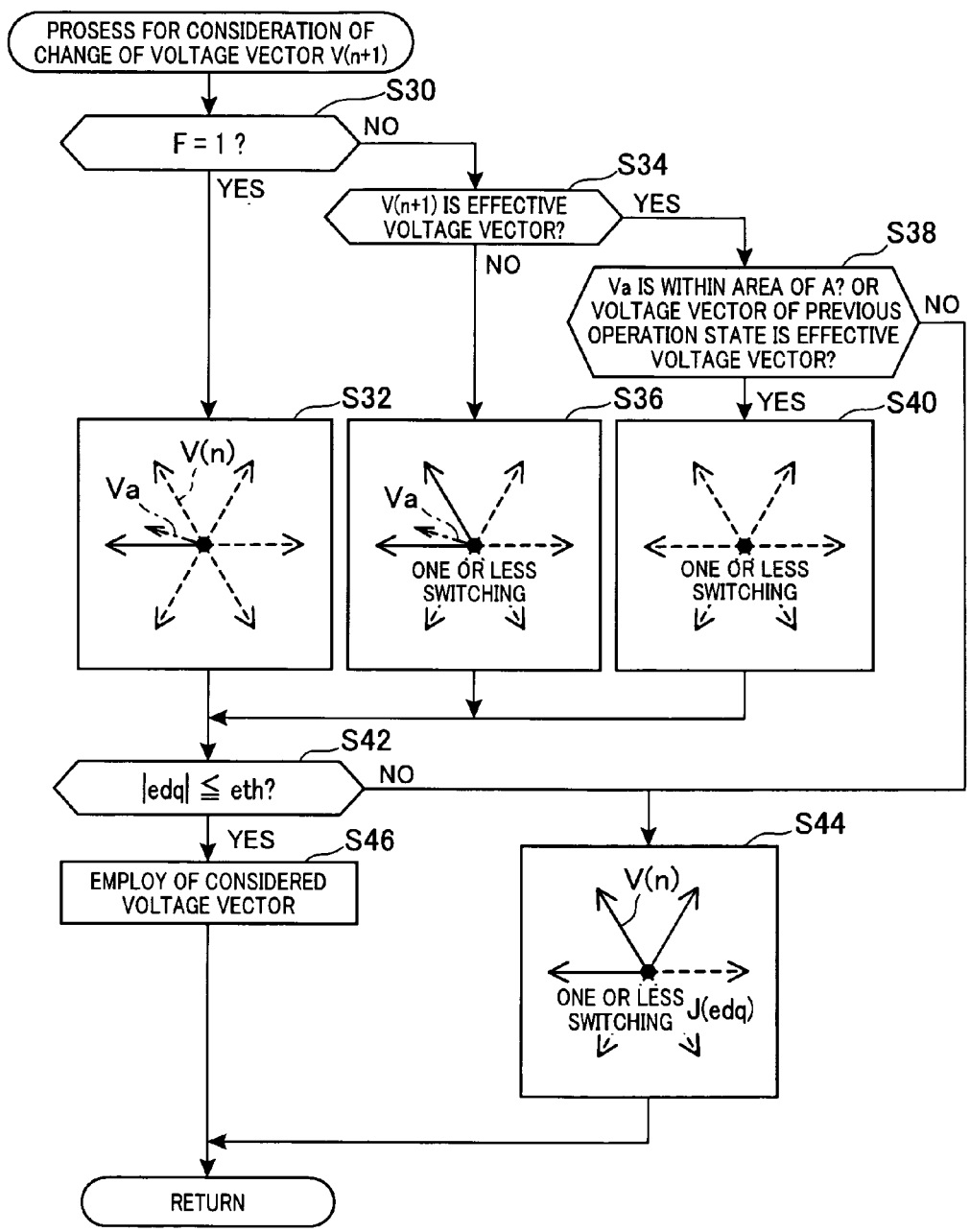
FIG. 9 is a flowchart showing a process of consideration of changing of the voltage vectors in the model predictive control.

Next, the process performed in step S22 is explained in detail with reference to FIG. 9.

This process begins by determining whether or not the state transition permission flag F is 1 in step S30. If the determination result in step S30 is affirmative, the process proceeds to step S32. In step S32, the process regards one of the two effective voltage vectors making the smallest angles with the average voltage vector Va, which is not the present voltage vector V(n) (the vector shown by the solid line in FIG. 6), as having the highest priority as a replacement of the present voltage vector (Vn), and sets it as an object of consideration.

On the other hand, if the determination result in step S30 is negative, the process proceeds to step S34 to determine whether or not the present voltage vector V(n) is the effective voltage. Step S30 is for giving priority to a specific one of the voltage vectors at the point P1 shown in FIG. 6. That is, if the determination result in step S34 is negative, the process proceeds to step S36 where the process regards one of the two effective voltage vectors making the smallest angles with the average voltage vector Va as having the highest priority, which represents the operation state achievable from the present operation state V(n) through switching of one or less phase, and sets it as an object of consideration. For example, if the two effective voltage vectors are the effective voltage vectors V3 and V4, and the present voltage vector is the zero voltage vector V0, the effective voltage vector V3 is set as an object of consideration, because the operation state represented by the effective voltage V3 can be achieved through switching of one phase and the operation state represented by the effective voltage V4 can be achieved through switching of two phases.

On the other hand, if the determination result in step S34 is affirmative, the operation proceeds to step S38 to determine whether the logical OR of a first condition and a second condition is true, the first condition being that there is present the effective voltage vector Vi making an angle of A (≤20°) with the average voltage vector Va, the second condition being that the previous voltage vector immediately before switch to the present voltage vector V(n) was the effective voltage vector. The second condition is for giving priority to the zero voltage vector at the point P3 shown in FIG. 6. The first condition is for giving priority to the zero voltage vector in view of that, when there is present the effective voltage vector Vi making a sufficiently small angle with the average voltage vector Va, the effective voltage vector Vi hardly contributes to forming the average voltage vector Va. If the determination result in step S34 is affirmative, the process proceeds to step S40 where the process regards the operation state represented by the zero voltage vector which can be achieved from the present operation state through switching of one or less phase as having the highest priority, and sets it as an object of consideration. For example, when the present voltage vector (Vn) is V4, the operation state represented by the zero voltage vector V7 is set as an object of consideration, and when the present voltage vector (Vn) is V3, the operation state represented by the zero voltage vector V0 is set as an object of consideration.

When step S32, S36 or S40 is completed, the process proceeds to step S42. In step S42, the predicted current vector Idqe (n+2) is calculated for the case where the operation state represented by the voltage vector set as an object of consideration is provisionally set, and it is determined whether or not the norm |edq| of the error vector edq is smaller than or equal to the threshold value eth for this case. If the determination result in step S42 is affirmative, the process proceeds to step S46 to employ the voltage vector set as an object of consideration.

On the other hand, if the determination result in step S42 or step S38 is negative, the process proceeds to step S44 where of all the voltage vectors representing operation states achievable from the operation state represented by the present voltage vector V(n) through switching of one or less phase, the one given the highest evaluation by the evaluation function J is adopted. For example, when the present vector V(n) is the effective voltage vector V3, of the effective voltage vectors V2, V3 and V4 and the zero voltage vector V0, the one given the highest evaluation by the evaluation function J is adopted.

When step S46 or S44 is completed, the process is terminated.

Next, the sound pressure control performed by the control apparatus 20 is explained. This embodiment is configured such that the noise generated from the motor-generator 10 and inverter 10 is sufficiently large within the audio frequency range perceptible to the human ear. This is because that the sound of friction between the drive wheels and the road surface is not large enough for a person or pedestrian to notice that a vehicle is approaching, when the vehicle is running at a low speed. Making the noise generated from the motor-generator 10 and inverter IV large within the audio frequency range can be implemented by manipulating the control cycle Tc (the update cycle of the operation state) of the model predictive control.

Figure 10:
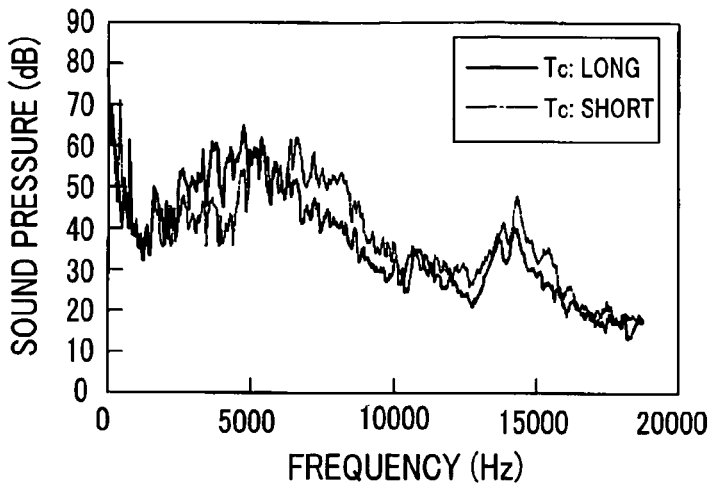
FIG. 10 is a diagram showing results of measurement of a relationship between the control cycle of the model predictive control and sound pressure frequency distribution.

FIG. 10 is a graph showing the relationship between the level of the sound pressure (dB) and frequency (Hz) of the sound generated from the motor-generator 10 and inverter IV for a case where the control cycle Tc is long (shown by the solid line) and a case where the control cycle Tc is short (show by the chain line).

As seen from FIG. 10, the peak frequency of the sound pressure (the frequency at which the sound pressure peaks) within the audio frequency range can be lowered by lengthening the control cycle Tc. In each of the case where the control cycle Tc is long and the case where the control cycle Tc is short, the sound pressure peaks within the frequency range from 0.5 to 8 kHz. Any sound within this frequency range is easy to be heard by the human ear. Hence, by lengthening the control cycle Tc when it is shorter than or equal to the one in the case shown by the chain line, it is possible to make the noise sound generated by the motor-generator 10 and inverter IV easy to be heard. The reason why the peak frequency is lowered by lengthening the control cycle Tc is that the switching frequency of the switch state is lowered. In this embodiment, when the control cycle Tc is long (shown by the solid line in FIG. 10), the sound pressure peaks within the frequency range from 1 to 5 kHz within the typical audio frequency range from 1 to 12 kHz. The frequency range from 1 to 5 kHz is a frequency range that can be easily perceived by the human ear without causing discomfort.

In this embodiment, the control cycle Tc is lengthened only when the vehicle runs at a low speed. The reason why the control cycle Tc is not lengthened so that the sound pressure peaks at a frequency within the frequency range from 1 to 5 kHz all the time irrespective of the vehicle speed is in view of the control accuracy and the necessity. Generally, when the vehicle speed is high, since the rotational speed of the motor-generator 10 is high, the discretization error in the model predictive control is large. Further, when the vehicle speed is high, since the sound due to friction between the drive wheels and the road surface becomes dominant in the sound emitted from the vehicle even when the main engine of the vehicle is an internal combustion engine only, it is rarely useful to use the sound of the vehicle main engine as means to make pedestrians near the vehicle notice that a vehicle is approaching. Hence, when the vehicle is running at a high speed, it is preferable to reduce the sound of the engine of the vehicle, because the sound of the engine is not effective as means to inform approach of the vehicle.

Figure 11:
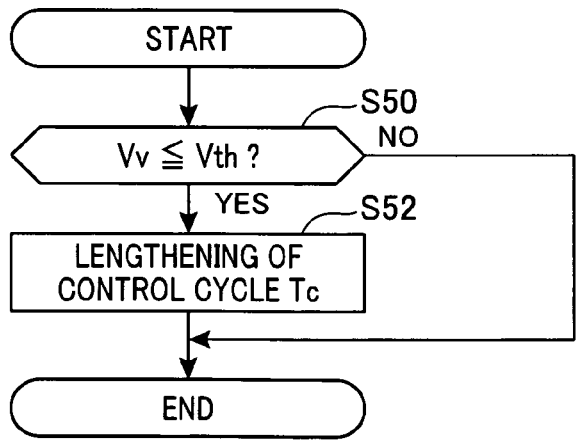
FIG. 11 is a flowchart showing a sound pressure control process in the first embodiment of the second invention.

The process of the sound pressure control in this embodiment is explained in the following with reference to the flowchart of FIG. 11. This process is performed at regular time intervals by the control apparatus 20.

This step begins by determining whether or not the vehicle speed Vv is lower than or equal to a threshold speed Vth in step S50. The threshold speed Vth is set to the higher limit of a speed range within which it is preferable to use the noise generated from the motor-generator 10 and inverter IV as means to inform approach of a vehicle. In this embodiment, the threshold speed Vth is set between 20 to 30 (preferably 20) km/h. If the determination result in step S50 is affirmative, the process proceeds to step S52 to lengthen the control cycle Tc. The value to which the control cycle Tc should be lengthened in order that the sound pressure peaks within the range from 0.5 to 8 kHz (preferably from 1 to 5 kHz) can be determined by experiment.

When step S52 is completed, or when a negative determination is made in step S50 is negative, the process is terminated.

The first embodiment described above provides the following advantages.

(1) The update timing (control cycle Tc) of the operation state of the inverter IV is lengthened when the vehicle is running at a low speed. This makes it possible to reduce switching frequency of the switch state, and accordingly to shift the peak frequency of the sound pressure to the frequency range which can be perceived easily by the human ear.

(2) The control cycle Tc is set such that the maximum value of the sound pressure within the frequency range from 0.5 to 8 kHz (preferably 1 to 5 kHz) is larger than the maximum value of the sound pressure within any higher frequency range. This setting makes it possible to increase the sound pressure within the frequency range easily perceived by the human ear.

Second Embodiment of Second Invention

Next, a second embodiment of the second invention is described with particular emphasis on the difference with the first embodiment.

In this embodiment, to reduce switching frequency of the switch state, the threshold value eth is increased. If the threshold value eth is increased, since the time needed for an affirmative determination to be made in step S18 shown in FIG. 7 increases, the switching frequency of the switch state can be reduced.

Figure 12:
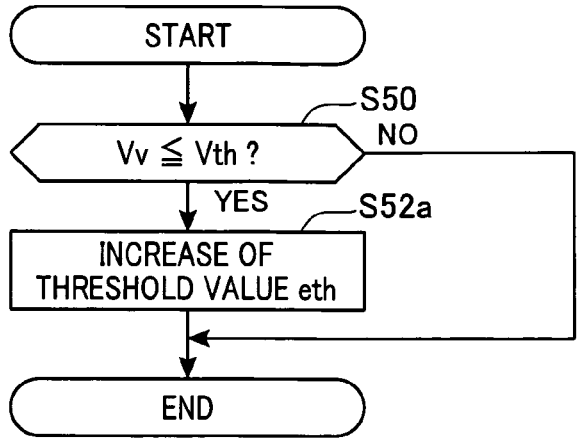
FIG. 12 is a flowchart showing a sound pressure control process in a second embodiment of the second invention.

FIG. 12 is a flowchart showing the process of the sound pressure control in this embodiment. This process is performed at regular time intervals by the control apparatus 20. In FIG. 12, the step numbers identical to those shown in FIG. 11 represent the same steps.

In this process, if the determination result in step S50 is affirmative, the threshold value eth is increases in step S52a. The threshold value eth is set to a value to enable shifting the peak frequency of sound pressure to within the frequency range easily perceived by the human ear by reducing the current ripple frequency due to switching of the switch state. Such a value can be determined by experiment.

According to this embodiment, in addition to the above advantage (2) provided by the first embodiment, the following advantage can be provided.

(3) The threshold value eth is increased when the vehicle is running at a low speed. This makes it possible to reduce the current ripple frequency due to switching of the switch state, and accordingly to shift the peak frequency of the sound pressure to within the frequency range easily perceived by the human ear.

Third Embodiment of Second Invention

Next, a third embodiment of the second invention is described with particular emphasis on the difference with the first embodiment.

Figure 13:
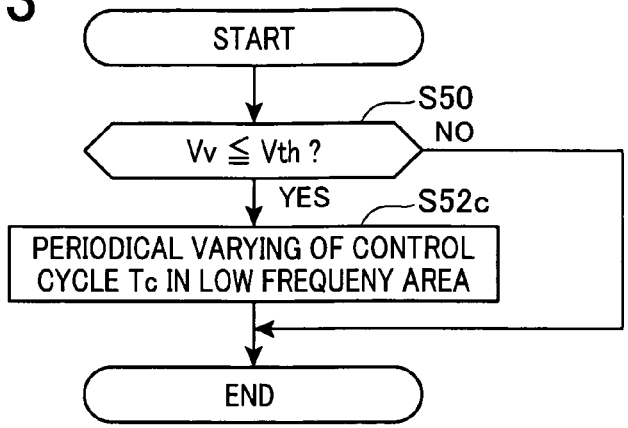
FIG. 13 is a flowchart showing a sound pressure control process in a third embodiment of the second invention.

FIG. 13 is a flowchart showing the process of the sound pressure control in this embodiment. This process is performed at regular time intervals by the control apparatus 20. In FIG. 13, the step numbers identical to those shown in FIG. 11 represent the same steps.

In this process, if the determination result in step S50 is affirmative, the control cycle Tc is lengthened, and also varied periodically. The reason why the lengthened control cycle Tc is varied periodically is based on the fact that a sound of a constant frequency is uncomfortable to the human ear.

In this embodiment, the control cycle Tc is varied periodically such that the peak frequency of the sound pressure varies within the range from 0.5 to 8 kHz (preferably 1 to 5 kHz). Varying the peak frequency in such a way can be implemented by controlling the control cycle Tc in accordance with an M-sequence signal, for example.

According to the third embodiment described above, in addition to the above advantages (1) and (2) provided by the first embodiment, the following advantage can be provided.

(4) The control cycle Tc is lengthened and also varied periodically. This makes it possible to vary the peak frequency of the sound pressure.

Fourth Embodiment of Second Invention

Next, a fourth embodiment of the second invention is described with particular emphasis on the difference with the first embodiment.

Figure 14:
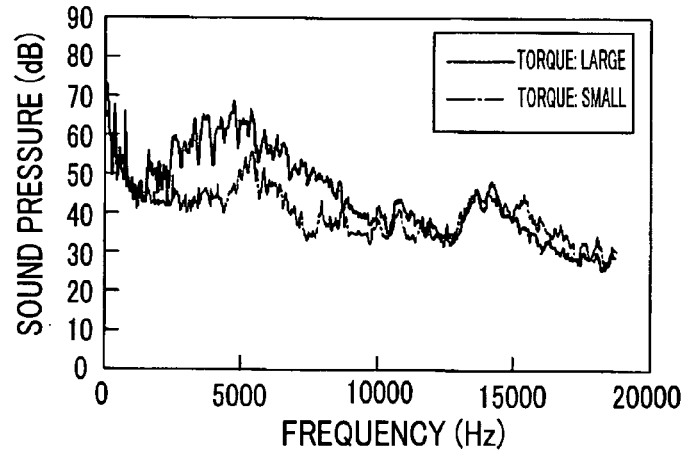
FIG. 14 is a diagram showing results of measurement of a relationship between the torque of a motor-generator and the sound pressure frequency distribution.

In this embodiment, when the control cycle Tc is lengthened, the efficiency of the motor-generator 10 (the ratio of the output power to the input power of the motor-generator 10) is reduced in order to increase the sound pressure. FIG. 14 is a graph showing the relationship between the level of the sound pressure and frequency of the sound generated from the motor-generator 10 and inverter IV for a case where the torque of the motor-generator 10 is large (shown by the solid line) and a case where the torque of the motor-generator 10 is small (shown by the chain line). As seen from FIG. 14, the sound pressure when the torque of the motor-generator 10 is large is smaller than when the torque of the motor-generator 10 is small. The reason is that when the torque of the motor-generator 10 is small, since the current flowing through the motor-generator 10 is small, the amplitude of the ripple current due to the switching of the switch state of the inverter IV is small. Accordingly, there is a concern that the sound pressure does not increase enough even when the control cycle Tc is lengthened to shift the peak frequency of the sound pressure to within the frequency range easily perceived to the human ear. Especially, when the vehicle is running on a flat road surface, it is likely that the sound pressure is insufficient because the required torque of the motor-generator 10 is small.

Accordingly, in this embodiment, when it is expected that the sound pressure will not be sufficient, the efficiency of the motor-generator 10 is reduced in order that the current of the motor-generator 10 becomes large for its torque, as a result of which the amplitude of the ripple current due to the switching of the switch state of the inverter IV becomes large, and accordingly the sound pressure becomes large.

Figure 15:
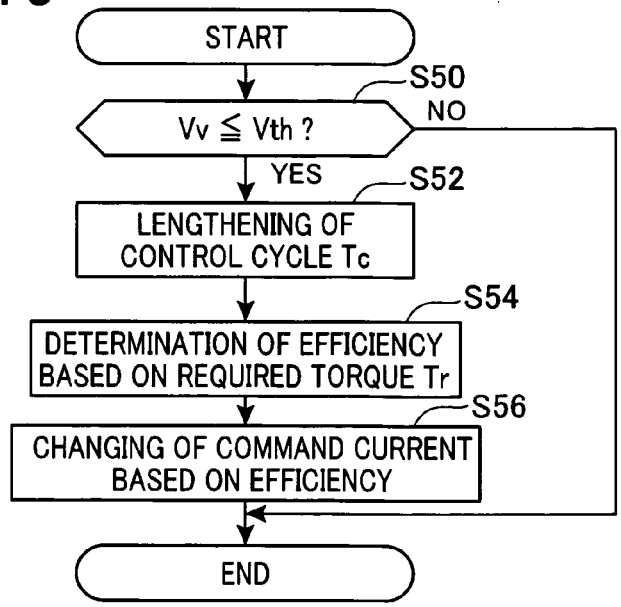
FIG. 15 is a flowchart showing a sound pressure control process in a fourth embodiment of the second invention.

FIG. 15 is a flowchart showing the process of the sound pressure control in this embodiment. This process is performed at regular time intervals by the control apparatus 20. In FIG. 15, the step numbers identical to those shown in FIG. 11 represent the same steps.

In this process, after completion of step S52, the efficiency of the motor-generator 20 is determined based on the required torque Tr. The required torque Tr is a parameter for detecting the current flowing through the motor-generator 10 to control the controlled variable (torque). In other words, the required torque Tr is a parameter to estimate the magnitude of the sound pressure. In this embodiment, since the current to control the controlled variable at a required value decreases with the decreases of the required torque Tr, the value of reduction of the efficiency (reduction from the efficiency when the maximum torque per ampere control is performed) is increased with the decrease of the required torque Tr.

In subsequent step S56, operation to change the command current based on the determined efficiency is performed. As a result, the amplitude of the ripple current due to the switching of the switch state of the inverter IV can be increased, while controlling the torque of the motor-generator 10 at the required torque Tr.

When step S56 is completed, or if the determination result at step S50 is negative, the process is terminated.

According to the fourth embodiment described above, in addition to the above advantages (1) and (2) provided by the first embodiment, the following advantage can be provided.

(5) The efficiency of the motor-generator 10 is reduced when the control cycle Tc is lengthened. This makes it possible to increase the amplitude of the ripple current without degrading the controllability of the motor-generator 10.

Fifth Embodiment of Second Invention

Next, a fifth embodiment of the second invention is described with particular emphasis on the difference with the fourth embodiment.

Figure 16:
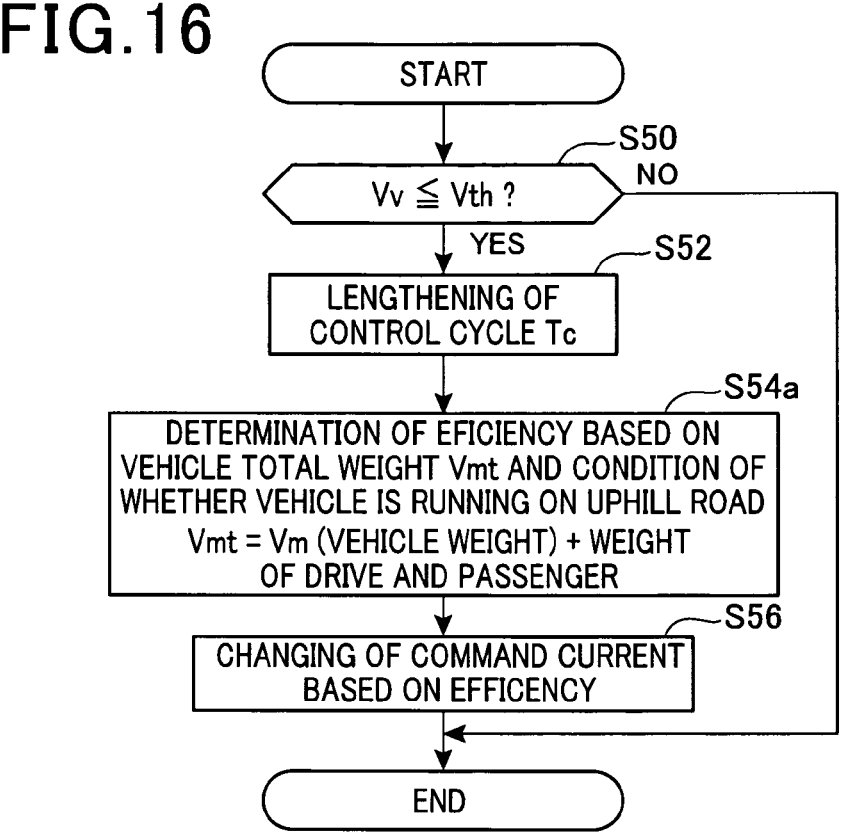
FIG. 16 is a flowchart showing a sound pressure control process in a fifth embodiment of the second invention.

FIG. 16 is a flowchart showing the process of the sound pressure control in this embodiment. This process is performed at regular time intervals by the control apparatus 20. In FIG. 16, the step numbers identical to those shown in FIG. 15 represent the same steps.

In this process, after step S52 is completed, the efficiency of the motor-generator 10 is determined based on information regarding the total weight Vmt of the vehicle and whether the vehicle is running on an uphill road or not. This information is information for estimating the current flowing through the motor-generator 10 to control the controlled variable of the motor-generator 10 at a required value. That is, since the required torque of the motor-generator 10 increases with the increases of the total weight Vmt of the vehicle, the current flowing through the motor-generator 10 is larger when the total weight Vmt of the vehicle is larger. Also, when the vehicle runs on an uphill road, since the required torque of the motor-generator 10 is large, the current flowing through the motor-generator 10 is large. Accordingly, in this embodiment, the efficiency of the motor-generator 10 is reduced more when the total weight Vmt is smaller, and is reduced less when the vehicle runs on an uphill road.

The total weight Vmt of the vehicle is the sum of the vehicle weight Vm and the weight of the driver and passenger.

The vehicle weight Vm may be stored in advance in the control apparatus 20. The weight of the driver and passenger may be calculated by a predetermined weight multiplied by the number of the driver and passenger detected by seat sensors mounted on the seats of the vehicle. Alternatively, the weight of the driver and passenger may be directly measured by weight sensors.

Sixth Embodiment of Second Invention

Next, a sixth embodiment of the second invention is described with particular emphasis on the difference with the third embodiment.

In this embodiment, instead of reducing the efficiency of the motor-generator 10, an average value of the actual torque of the motor-generator 10 is controlled at the required torque Tr while being periodically varied. In this case, since the actual torque of the motor-generator 10 exceeds the required torque Tr in a microscopic time scale, it is possible to increase the current flowing through the motor-generator 10 in a microscopic time scale. This makes it possible to increase the maximum value of the amplitude of the ripple current due to the switching of the switch state of the inverter IV, and accordingly to increase the sound pressure.

Figure 17:
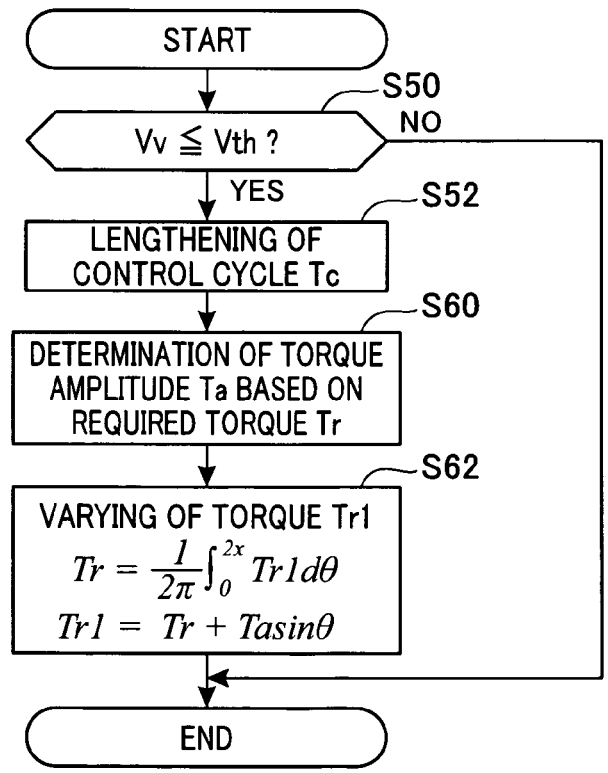
FIG. 17 is a flowchart showing a sound pressure control process in a sixth embodiment of the second invention.

FIG. 17 is a flowchart showing the process of the sound pressure control in this embodiment. This process is performed at regular time intervals by the control apparatus 20. In FIG. 17, the step numbers identical to those shown in FIG. 11 represent the same steps.

This step begins by determining the amplitude Ta of the torque of the motor-generator 10 based on the required torque Tr in step S60 after completion of step S52. The required torque Tr is a parameter for estimating the current flowing through the motor-generator 10 to control the controlled variable (torque) at a required value. In this embodiment, since the current to control the controlled variable at a required value decreases with the decreases of the required torque Tr, the amplitude Ta is increased with the decrease of the required torque Tr.

In subsequent step S62, the actual torque of the motor-generator 10 is controlled so that it varies while having the amplitude Ta. This is possible by correcting the required torque Tr inputted to the command current setting section 24 as an input parameter in accordance with a sinusoidal function of the amplitude Ta. In this embodiment, the period of the sinusoidal function is set equal the period of the electrical angle θ.

If the determination result in step S50 is negative, or when step S62 is completed, the process is terminated.

According to the sixth embodiment described above, in addition to the above advantages (1) and (2) provided by the first embodiment, the following advantage can be provided.

(6) When the control cycle period Tc is lengthened, as the required torque Tr, the torque command value Tr1 as an input parameter of the model predictive control being periodically varied is used. This makes it possible that the actual torque of the motor-generator 10 exceeds the required torque Tr in a microscopic time scale, and the amplitude of the ripple current is larger compared to that when the torque is not varied periodically. As a result, the maximum value of the sound pressure can be increased.

Seventh Embodiment of Second Invention

Next, a seventh embodiment of the second invention is described with particular emphasis on the difference with the sixth embodiment.

Figure 18:
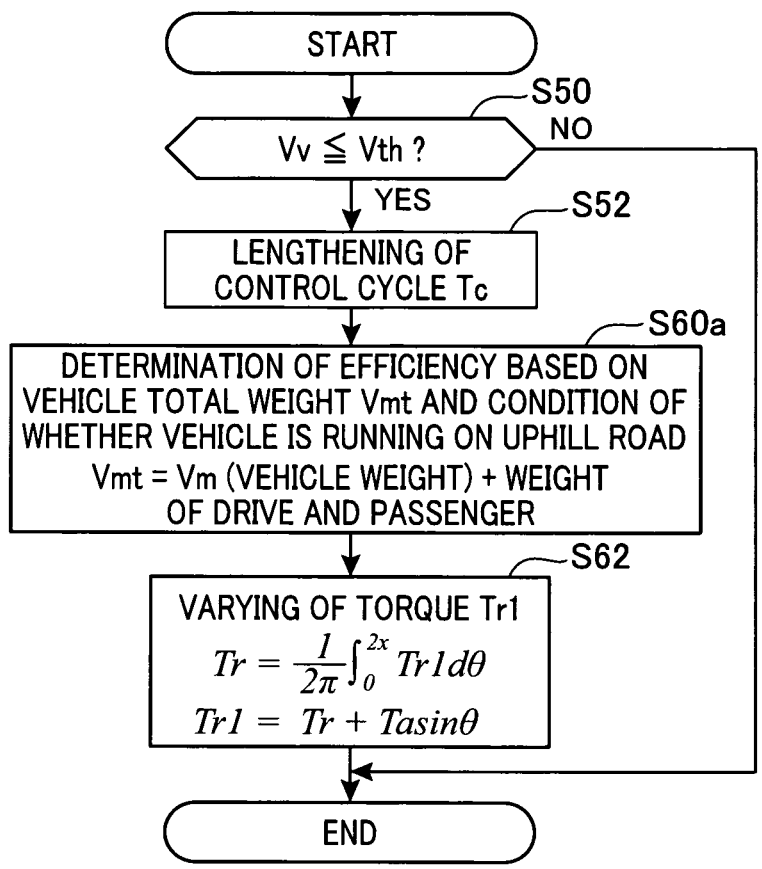
FIG. 18 is a flowchart showing a sound pressure control process in a seventh embodiment of the second invention.

FIG. 18 is a flowchart showing the process of the sound pressure control in this embodiment. This process is performed at regular time intervals by the control apparatus 20. In FIG. 18, the step numbers identical to those shown in FIG. 17 represent the same steps.

In this process, after steps S50 and S52 are completed, the amplitude of the torque of the motor-generator 10 is determined based on information regarding the total weight Vmt of the vehicle and whether the vehicle is running on an uphill road or not. This information has the same technical significance as that in step S54a shown in FIG. 16.

Eighth Embodiment of Second Invention

Next, an eighth embodiment of the second invention is described with particular emphasis on the difference with the fourth embodiment.

In this embodiment, the reduction of the efficiency of the motor-generator 10 is limited under a predetermined condition.

Figure 19:
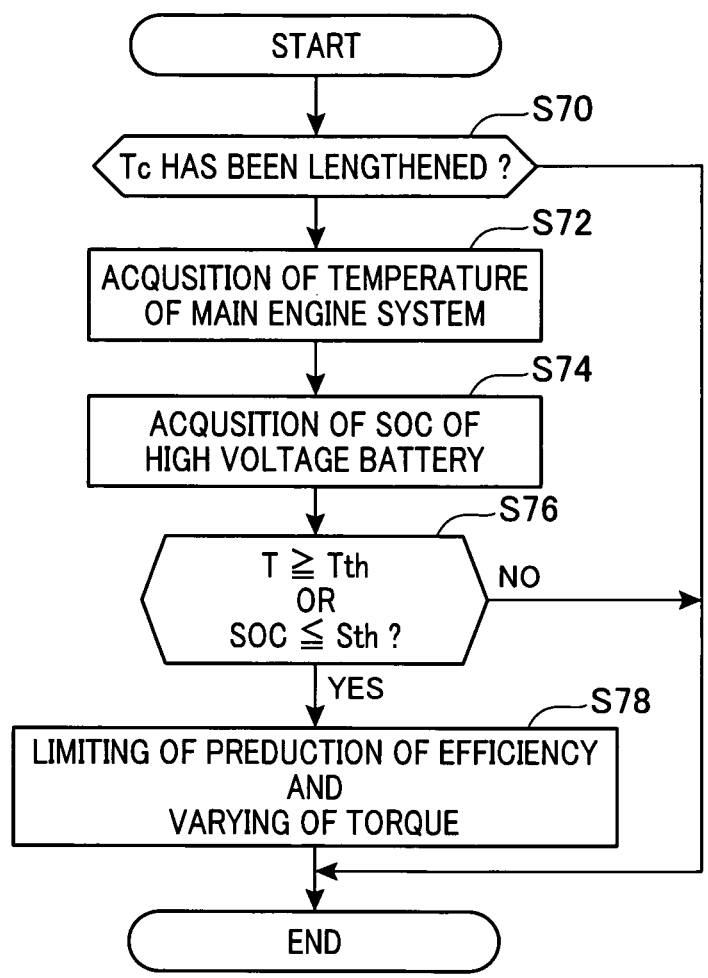
FIG. 19 is a flowchart showing a process of limiting reduction of the efficiency of a motor-generator in an eighth embodiment of the second invention.

FIG. 19 is a flowchart showing the process of limiting the reduction of the efficiency of the motor-generator 10. This process is performed at regular time intervals by the control apparatus 20.

This process begins in step S70 to determine whether or not the control cycle period Tc has been lengthened. If the determination result in step S70 is affirmative, the process proceeds to step S72 to acquire the temperature T of the main engine system. Here, the temperature T of the main engine system is the temperature of the switching elements of the inverter IV or the motor-generator 10. In subsequent step S74, the remaining capacity (state of charge) SOC of the high voltage battery 12 is acquired. Subsequently, in step S76, it is determined whether or not the logical OR of two conditions (a) and (b) is true, the condition (a) being that the temperature T is higher than or equal to a threshold temperature Tth, the condition (b) being that the remaining capacity SOC is lower than or equal to a threshold capacity Sth. Step S76 is for determining whether a condition to limit the reduction of the efficiency of the motor-generator 10 is satisfied. If the temperature T is too high, there is a concern that the reliability of the main engine system degrades. If the remaining capacity SOC is too low, there is a concern that the reliability or distance coverage of the high voltage battery 12 degrades.

Accordingly, if the determination result in step S76 is affirmative, the reduction of the efficiency is limited in order to prevent the temperature T from further increasing, and to prevent the remaining capacity SOC from further decreasing. Limiting the reduction of the efficiency causes the ripple current to decrease through variation of the torque as in the case of the seventh embodiment.

If the determination result in step S70 or S76 is negative, or when step S78 is completed, the process is terminated.

According to the eighth embodiment described above, in addition to the above advantages (1) and (2) provided by the first embodiment, the following advantages can be provided.

(7) When the temperature T of the main engine system is too high, the reduction of the efficiency of the motor-generator 10 is limited. This makes it possible to prevent the temperature T from further increasing.

(8) When the remaining capacity SOC of the high voltage battery 12 is too low, the reduction of the efficiency of the motor-generator 10 is limited. This makes it possible to prevent the remaining capacity SOC from further decreasing.

(9) The average value of the actual torque of the motor-generator 10 is controlled at the required torque Tr while the torque is periodically varied when the reduction of the efficiency of the motor-generator 10 is limited. This makes it possible to lessen the limiting of the sound pressure due to the limiting of the reduction of the efficiency of the motor-generator 10.

Ninth Embodiment of Second Invention

Next, a ninth embodiment of the second invention is described with particular emphasis on the difference with the fourth embodiment.

In this embodiment, the sound level outside of the vehicle is feed-back controlled.

Figure 20:
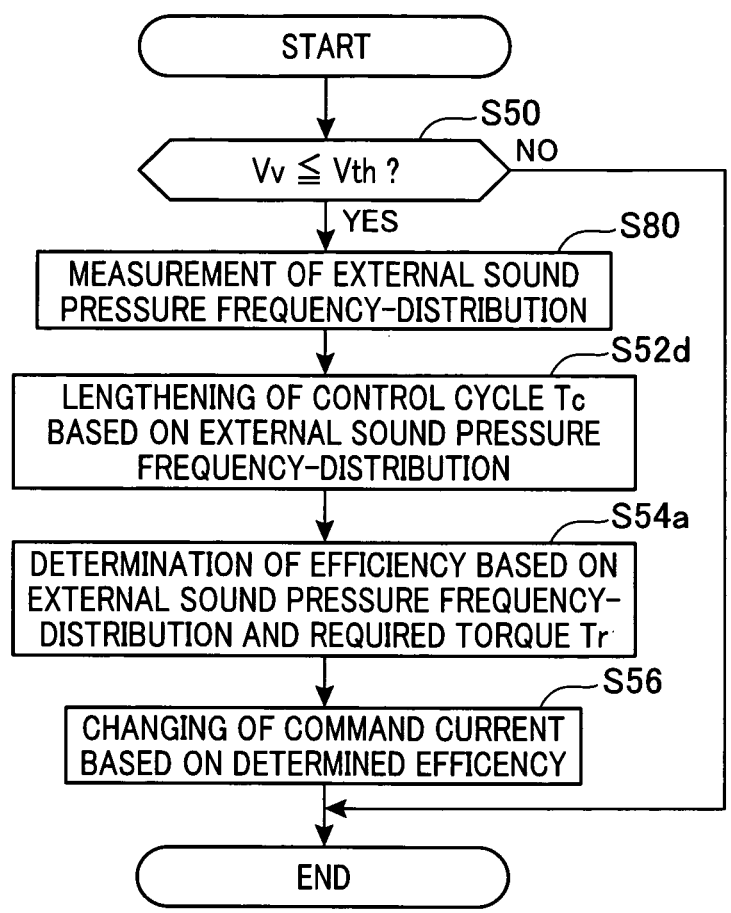
FIG. 20 is a flowchart showing a sound pressure control process in a ninth embodiment of the second invention.

FIG. 20 is a flowchart showing the process of the sound pressure control in this embodiment. This process is performed at regular time intervals by the control apparatus 20. In FIG. 20, the step numbers identical to those shown in FIG. 15 represent the same steps.

In this process, if the determination result in step S50 is affirmative, the sound pressure frequency distribution outside the vehicle is measured in step S80 by using a microphone mounted on the vehicle so as to project from the vehicle body, for example. After completion of step S80, the control cycle period Tc is lengthened in accordance with the result of measurement of the sound pressure frequency distribution. In this embodiment, the control cycle Tc is set such that the peak frequency of the sound pressure due to the motor-generator 10 and inverter IV is shifted to a frequency position within the frequency range from 0.5 to 8 kHz (preferably 1 to 5 kHz) at which the sound pressure of the sound outside of the vehicle is relatively low.

In subsequent step S54a, the efficiency of the motor-generator 10 is determined based on the result of measurement of the sound pressure frequency distribution and the required torque Tr. Here, the required torque Tr has the same technical significance as that in step S54 shown in FIG. 15. The reason why the result of measurement of the sound pressure frequency distribution is used in determining the efficiency of the motor-generator 10 is to ensure the sound pressure to be large enough not to be masked by the sound outside of the vehicle. After completion of step S54a, the process proceeds to step S56 to change the command current based on the determined efficiency.

If the determination result in step S50 is negative, or when step S56 is completed, the process is terminated.

According to the ninth embodiment, in addition to the above advantages (1) and (2) provided by the first embodiment, the following advantages can be provided.

(10) The control cycle Tc is variably set in accordance with the result of measurement of the sound pressure frequency distribution outside of the vehicle. This makes it possible to make a difference between the peak frequency of the sound pressure of the external sound and the peak frequency of the sound generated by the switching of the switch state.

The efficiency of the motor-generator 10 is variably set in accordance with the result of measurement of the sound pressure frequency distribution outside of the vehicle. This makes it possible that the sound pressure of the sound generated by the switching of the switch state is not masked by the sound pressure of the external sound.

Tenth Embodiment of Second Invention

Next, a tenth embodiment of the invention is described with particular emphasis on the difference with the ninth embodiment.

Figure 21:
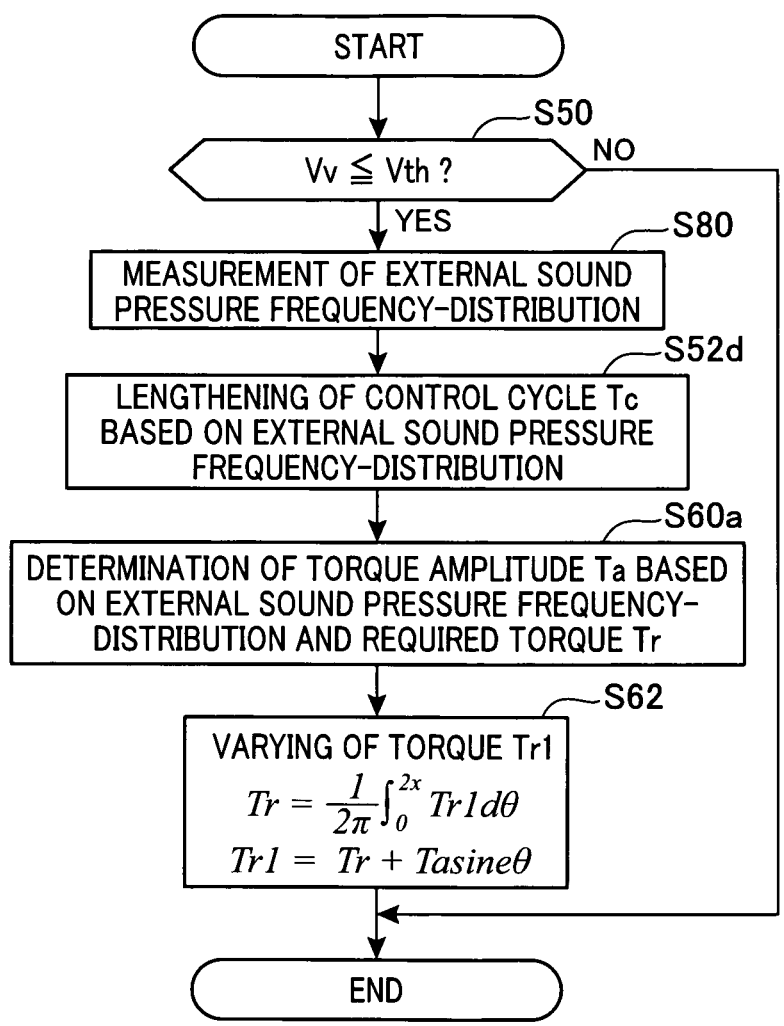
FIG. 21 is a flowchart showing a sound pressure control process in a tenth embodiment of the second invention.

FIG. 21 is a flowchart showing the process of the sound pressure control in this embodiment. This process is performed at regular time intervals by the control apparatus 20. In FIG. 21, the step numbers identical to those shown in FIG. 20 represent the same steps.

In this process, after completion of step S52d, the amplitude Ta of the torque is determined based on the result of measurement of the sound pressure frequency distribution and the required torque Ta in step S60a. Here, the required torque Tr has the same technical significance as that in step S60 shown in FIG. 17. The reason why the result of measurement of the sound pressure frequency distribution is used in determining the amplitude Ta is to ensure the sound pressure to be large enough not to be masked by the sound outside of the vehicle. After completion of step s60a, the process proceeds to step S62 to vary the torque in accordance with the determined torque Ta.

If the determination result in step S50 is negative, or when step S62 is completed, the process is terminated.

According to the tenth embodiment, in addition to the above advantage (10) provided by the ninth embodiment, the following advantage can be provided.

(12) The amplitude Ta of the torque is variably set in accordance with the result of measurement of the sound pressure frequency distribution. This makes it possible that the sound pressure generated due to the switching of the switch state of the inverter IV is not masked by the sound pressure of the external sound.

Other Embodiments of Second Invention

It is a matter of course that various modifications can be made to the above embodiments as described below.

Regarding the Varying Means:

The means to vary the control cycle Tc is not limited to the one that periodically varies control cycle Tc. For example, the varying means may be configured to aperiodically vary the control cycle Tc using a means to store a larger number of different values of the control cycle Tc than the number of the values to which the control cycle Tc should be changed during a period of time in which the efficiency is reduced.

Regarding the Efficiency Reducing Means:

The means to reduce the efficiency of the motor-generator 10 is not limited to the one that reduces the efficiency while keeping the actual torque at the required torque Tr. For example, the efficiency reducing means may be configured to reduce the efficiency by shifting the phases of the command currents idr and iqr.

Instead of the required torque Tr, the q-axis current may be used to variably set the extent of the reduction of the efficiency, because as the q-axis current decreases, the ripple current decreases, and accordingly the sound pressure decreases.

The efficiency may be set based on one of the running condition and the total weight of the vehicle, not both of them. The efficiency may be set based on the vehicle weight not including the weight of the vehicle driver and passenger. The running condition of the vehicle is not limited to whether the vehicle is running on an uphill road or not. For example, the running condition of the vehicle may be a combination of whether or not the vehicle is running on an uphill road, and the speed of the head wind.

Regarding the Limiting of the Reduction of the Efficiency:

The limiting of the reduction of the efficiency does not necessarily have to be implemented by varying the torque. For example, the limiting of the reduction of the efficiency may be implemented by increasing the threshold value eth when the control cycle Tc is lengthened in a low speed area. By increasing the threshold value eth, since the switching frequency is further decreased, the ripple current increase, and accordingly the sound pressure increases. When the threshold value eth is increased in the low speed area, the control cycle Tc may be lengthened at the time of limiting the reduction of the efficiency.

Regarding the Torque Variably Setting Means:

The amplitude Ta of the torque may be variably set using the q-axis current instead of the required torque Tr, because as the q-axis current decreases, the ripple current decreases, and accordingly the sound pressure decreases.

The amplitude Ta of the torque may be set based on one of the running condition and the total weight of the vehicle, not both of them. The efficiency may be set based on the vehicle weight not including the weight of the vehicle driver and passenger. The running condition of the vehicle is not limited to whether the vehicle is running on an uphill road or not. For example, the running condition of the vehicle may be a combination of whether or not the vehicle is running on an uphill road, and the speed of the head wind. Regarding the condition to forcibly reduce the switching frequency of the switch state: In the above embodiments, the switching frequency is forcibly reduced when vehicle speed is below a predetermined speed. However, when the vehicle has an internal combustion engine as its main engine, the switching frequency may be forcibly reduced when a result of TRUE is obtained from a logical AND of (a) that the vehicle speed is below the predetermined speed and (b) that the internal combustion engine is stopped.

Regarding the Switching Frequency Reducing Means:

The switching frequency reducing means is not limited to the one that performs open-loop control in order that the sound pressure within the frequency range from 0.5 to 8 kHz becomes larger than that within any frequency range higher than the frequency range from 0.5 to 8 kHz. For example, the switching frequency reducing means may include means to measure the sound pressure generated from the motor-generator 10 and inverter IV to perform feedback control of the sound pressure.

Regarding the Switch State Maintaining Means:

The switch state maintaining means is not limited to the one that performs the process shown in FIG. 7. For example, it may be configured to maintain the present current switch state when the norm $|edq|$ of the error vector edq is smaller than or equal to the threshold value eth, and select one from all the operation states (voltage vectors V0 to V7), which is given the highest evaluation by the evaluation function J when the norm $|edq|$ of the error vector edq exceeds the threshold value eth.

Regarding the Evaluation Function:

The evaluation function is not limited to the sum of the square of each of the components of the difference between the controlled variable as an input parameter and the command value. For example, it may be the absolute value of the difference between them. Any function may be used as the evaluation function, if it quantifies the difference between them to a lower evaluation value when the difference is larger.

Regarding the Predicting Means:

In the above embodiments, the controlled variable as a result of manipulation of the inverter IV at the next update timing (the timing one control cycle ahead) of the switch state of the inverter IV is predicted. However, it is possible to determine the operation state of the inverter IV at the update timing one control cycle ahead, by predicting the controlled variable of the inverter IV at each of the update timings up to several control cycles ahead.

In the above embodiments, the timing to measure the current is synchronized with the timing to update the operation state of the inverter IV. However, the current may be measured at the center timing between each time-adjacent update timings.

Also in this case, it is effective to predict, based on the measured current, the current at the next update timing as an initial value of the current prediction of the operation state of the inverter set as the one at the next update timing.

In the above embodiments, the controlled variable at a time one control cycle ahead from the update timing of the operation state of the inverter IV is predicted. However, the controlled variable at a time within one control cycle ahead from the update timing of the operation state of the inverter IV may be predicted.

The model used to predict the current is not limited to the one that neglects iron loss. The current may be predicted using a model that takes into account iron loss.

The current prediction does not necessarily have to be performed using a model. It may be performed using a storage means (map) storing the values of an output parameter corresponding to discrete values of an input parameter.

Regarding the Power Conversion Circuit:

The power conversion circuit including the switching elements to selectively make and break connections between two different voltage sources and the corresponding terminals of the electric rotating machine is not limited to the inverter IV. For example, it may be one that selectively makes and breaks connections between three or more different voltage sources and the corresponding terminals of the electric rotating machine. Such a power conversion circuit is described, for example, in Japanese Patent Application Laid-open No. 2006-174697. The above embodiments are directed to an interior permanent magnet synchronous machine. However, the present invention is also applicable to a surface permanent magnet synchronous machine, and a field winding synchronous machine. Further, the present invention is also applicable to an induction rotating machine such as an induction motor.

The energy source of the electric rotating machine is not limited to a secondary battery. For example, it may be a fuel cell.

Although the high voltage battery 12 is used as a DC power source in the above embodiments, the DC power source may be a converter which steps up the voltage of the high voltage battery 12.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use power supply control apparatus for controlling transmission of electric power between a vehicle-mounted power supply apparatus mounted on a vehicle and an external power supply located outside the vehicle by manipulating the vehicle-mounted power supply apparatus, the vehicle-mounted power supply apparatus including switching elements turned on and off in accordance with manipulation signals, the vehicle-use power supply control apparatus comprising:
   a control section to output an electric power transmission command signal depending on an electric power transmission request signal received from an external device; and
   a manipulation signal generating section to generate the manipulation signals based on the electric power transmission command signal received from the control section,
   wherein the control section is configured to operate in order that noise sound generated due to switching operation of the vehicle-mounted power supply apparatus is within an audio frequency range.

2. The vehicle-use power supply control apparatus according to claim 1, wherein the control section is configured to operate in order that a maximum value of sound pressure of the noise sound within a frequency range from 0.5 kHz to 8 kHz is larger than a maximum value of sound pressure of the noise sound within any frequency range higher than the frequency range from 0.5 kHz to 8 kHz.

3. The vehicle-use power supply control apparatus according to claim 1, wherein the control section is configured to operate in order that sound pressure of the noise sound increases with increase of electric power transmitted between the vehicle-mounted power supply apparatus and the external power supply.

4. The vehicle-use power supply control apparatus according to claim 1, wherein the control section is configured to variably set at least one of switching frequency of the switching elements and sound pressure of the noise sound based on a level of ambient sound.

5. The vehicle-use power supply control apparatus according to claim 1, wherein the vehicle is provided with a power conversion circuit connected to a motor-generator and including switching elements turned on and off while the vehicle runs,
   a frequency at which sound pressure of noise sound generated by switching operation of the power conversion circuit peaks within the audio frequency range being different from a frequency at which sound pressure of the noise sound generated by the switching operation of vehicle-mounted power supply apparatus peaks within the audio frequency range.

6. A control apparatus for controlling an electric rotating machine mounted on a vehicle as a main engine of the vehicle by manipulating, based on model predictive control, a power conversion circuit including a plurality of switching elements that selectively make and break connections between a plurality of voltage sources outputting different voltages and corresponding terminals of the electric rotating machine, comprising:
   a prediction means to predict, using a predetermined model of the electric rotating machine, a controlled variable of the electric rotating machine when the power conversion circuit is assumed to be set in a provisional operation state; and
   a manipulation means to determine an actual operation state of the electric rotating machine based on the predicted controlled variable and a command value indicative of a required controlled variable received from outside, and manipulate the power conversion circuit so that the power conversion circuit is brought to the determined actual operation state;
   wherein the manipulation means includes a switching frequency reducing means configured to forcibly reduce a switching frequency of switch states of the switching elements on condition that a running speed of the vehicle is below a predetermined speed.

7. The control apparatus according to claim 6, wherein the switching frequency reducing means is configured to reduce the switching frequency in order that a maximum value of a sound pressure due to operation of the power conversion circuit within a first frequency range from 0.5 to 8 kHz is larger than a maximum value of the sound pressure within any frequency range higher than 8 kHz.

8. The control apparatus according to claim 7, wherein the command value includes a current value indicative of a value of a current flowing through the electric rotating machine, and the manipulation means includes an efficiency reducing means to change the command value such that the an efficiency of the electric rotating machine is reduced when the switching frequency reducing means reduces the switching frequency.

9. The control apparatus according to claim 8, wherein the efficiency reducing means is configured to variably set an extent of reduction of the efficiency of the electric rotating machine depending on at least one of torque of the electric rotating machine, a weight of the vehicle and a running condition of the vehicle.

10. The control apparatus according to claim 8, further comprising a temperature measuring means to measure temperature of at least one of the electric rotating machine and the power conversion circuit, the efficiency reducing means being configured to limit reduction of the efficiency of the electric rotating machine when the temperature measured by the temperature measuring means is above a predetermined temperature.

11. The control apparatus according to claim 10, wherein the plurality of the voltage sources are constituted of a battery, and the control apparatus further comprises a capacity ensuring means configured to limit reduction of the efficiency of the electric rotating machine when a remaining capacity of the battery is smaller than a predetermined value.

12. The control apparatus according to claim 10, wherein the model predictive control is for controlling torque of the electric rotating machine at a required torque inputted thereto as an input parameter, and the control apparatus further comprises a torque variably setting means to periodically vary the required torque as the input parameter while keeping an average value of the varied torque at the required torque when the efficiency reducing means limits reduction of the efficiency of the electric rotating machine.

13. The control apparatus according to claim 12, wherein the torque variably setting means is configured to variably set extent of periodical variation of the command value of the torque depending on at least one of torque of the electric rotating machine, a weight of the vehicle and a running condition of the vehicle.

14. The control apparatus according to claim 8, further comprising a sound pressure frequency-distribution measuring means to measure frequency distribution of sound pressure outside of the vehicle, the efficiency reducing means being configured to variably set extent of reduction of the efficiency depending on the frequency distribution of the sound pressure outside of the vehicle measured by the sound pressure frequency-distribution measuring means.

15. The control apparatus according to claim 8, further comprising a sound pressure frequency-distribution measuring means to measure frequency distribution of sound pressure outside of the vehicle, the torque variably setting means being configured to variably set extent of periodical variation of the command value of the torque depending on the frequency distribution of the sound pressure outside of the vehicle measured by the sound pressure frequency-distribution measuring means.

16. The control apparatus according to claim 6, wherein the switching frequency reducing means includes a lengthening means to lengthen a cycle of update timing of the actual operation state of the power conversion circuit to reduce the switching frequency of switch states of the switching elements.

17. The control apparatus according to claim 16, wherein the switching frequency reducing means is configured to vary extent of reduction of the switching frequency when the switching frequency is forcibly reduced.

18. The control apparatus according to claim 6, wherein the manipulation means includes a maintaining means configured to maintain present switch states of the switching elements on condition that a difference between the predicted controlled variable and the required controlled variable is smaller than a threshold value, and the switching frequency reducing means is configured to increase the threshold value to reduce the switching frequency of switch states of the switching elements.

19. The control apparatus according to claim 18, wherein the switching frequency reducing means is configured to vary extent of reduction of the switching frequency when the switching frequency is forcibly reduced.

20. The control apparatus according to claim 6, wherein the model predictive control is for controlling torque of the electric rotating machine at a required torque inputted thereto as an input parameter, and the control apparatus further comprises a torque variably setting means to periodically vary the required torque as the input parameter while keeping an average value of the varied torque at the required torque.

21. The control apparatus according to claim 20, wherein the torque variably setting means is configured to variably set extent of periodical variation of the command value of the torque depending on at least one of torque of the electric rotating machine, a weight of the vehicle and a running condition of the vehicle.

22. The control apparatus according to claim 6, further comprising a sound pressure frequency-distribution measuring means to measure frequency distribution of sound pressure outside of the vehicle, the switching frequency reducing means being configured to variably set extent of reduction of the switching frequency depending on the frequency distribution of the sound pressure outside of the vehicle measured by the sound pressure frequency-distribution measuring means.

23. The control apparatus according to claim 6, wherein each of the switching elements of the power conversion circuit is for connecting a corresponding one of the terminals of the electric rotating machine to a selected one of positive and negative electrodes of a DC power source.

* * * * *